US006775284B1

(12) United States Patent
Calvignac et al.

(10) Patent No.: US 6,775,284 B1
(45) Date of Patent: Aug. 10, 2004

(54) METHOD AND SYSTEM FOR FRAME AND PROTOCOL CLASSIFICATION

(75) Inventors: Jean Louis Calvignac, Cary, NC (US); Gordon Taylor Davis, Chapel Hill, NC (US); Anthony Matteo Gallo, Apex, NC (US); Marco C. Heddes, Raliegh, NC (US); Ross Boyd Leavens, Cary, NC (US); Michael Steven Siegel, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/479,027

(22) Filed: Jan. 7, 2000

(51) Int. Cl.[7] .............................................. H04L 12/56
(52) U.S. Cl. ...................................... 370/392; 370/469
(58) Field of Search .............................. 370/252, 254, 370/255, 392, 455, 466, 469, 470, 471, 474, 476, 395.5; 709/201, 238, 249

(56) References Cited

U.S. PATENT DOCUMENTS

| | | | |
|---|---|---|---|
| 4,901,312 A | | 2/1990 | Hui et al. ................. 370/85.12 |
| 4,924,210 A | | 5/1990 | Matsui et al. ............... 340/572 |
| 5,280,480 A | * | 1/1994 | Pitt et al. .................... 370/256 |
| 5,357,632 A | * | 10/1994 | Pian et al. ................... 709/105 |
| 5,530,703 A | * | 6/1996 | Liu et al. .................... 370/255 |
| 5,617,419 A | | 4/1997 | Christensen et al. ........ 370/471 |
| 5,748,905 A | | 5/1998 | Hauser et al. ......... 395/200.79 |
| 5,764,645 A | | 6/1998 | Bernet et al. ............... 370/466 |
| 5,774,657 A | | 6/1998 | Okamura et al. ........ 395/200.6 |
| 5,815,670 A | | 9/1998 | Iverson et al. ......... 395/200.77 |
| 5,870,394 A | | 2/1999 | Oprea ........................ 370/392 |
| 5,892,768 A | | 4/1999 | Jeng ............................ 370/445 |
| 5,940,401 A | | 8/1999 | Frazier, Jr. et al. ......... 370/445 |
| 5,946,313 A | | 8/1999 | Allan et al. ................. 370/397 |
| 5,991,299 A | * | 11/1999 | Radogna et al. ............. 370/392 |
| 6,172,980 B1 | * | 1/2001 | Flanders et al. ............ 370/401 |
| 6,192,051 B1 | * | 2/2001 | Lipman et al. ............. 370/389 |
| 6,424,934 B2 | * | 7/2002 | Welfeld ........................ 703/25 |
| 2002/0091844 A1 | * | 7/2002 | Craft et al. ................. 709/230 |
| 2003/0108038 A1 | * | 6/2003 | Devanagondi et al. ...... 370/389 |
| 2003/0144993 A1 | * | 7/2003 | Kishigami ..................... 707/3 |

OTHER PUBLICATIONS

International Search Report—PCT—Jun. 25, 2001.

* cited by examiner

Primary Examiner—Hassan Kizou
Assistant Examiner—Christopher M Swickhamer
(74) Attorney, Agent, or Firm—Kenneth A. Seaman

(57) ABSTRACT

A system and method of protocol and frame classification in a system for data processing (e.g., switching or routing data packets or frames). The present invention includes analyzing a portion of the packet or frame according to predetermined tests, then storing key characteristics of the packet for use in subsequent processing of the frame. The key characteristics for the frame (or input information unit, such as the type of layer 3 protocol used in the frame, the layer 2 encapsulation technique, the starting instruction address and flags indicating whether the frame uses a virtual local area network, preferably using hardware to quickly and in a uniform time period. The stored key characteristics of the packet are then used by the network processing complexes in its further processing of the frame. The processor is preconditioned with a starting instruction address and the location of the beginning of the layer 3 header as well as flags for the type of frame. That is, the instruction address or code entry point is used by the processor to start processing for a frame at the right place, based on the type of frame. Additionally, additional instruction addresses can be stacked and used sequentially at branches to avoid additional tests and branching instructions.

25 Claims, 20 Drawing Sheets

BLOCK DIAGRAM OF THE EPC

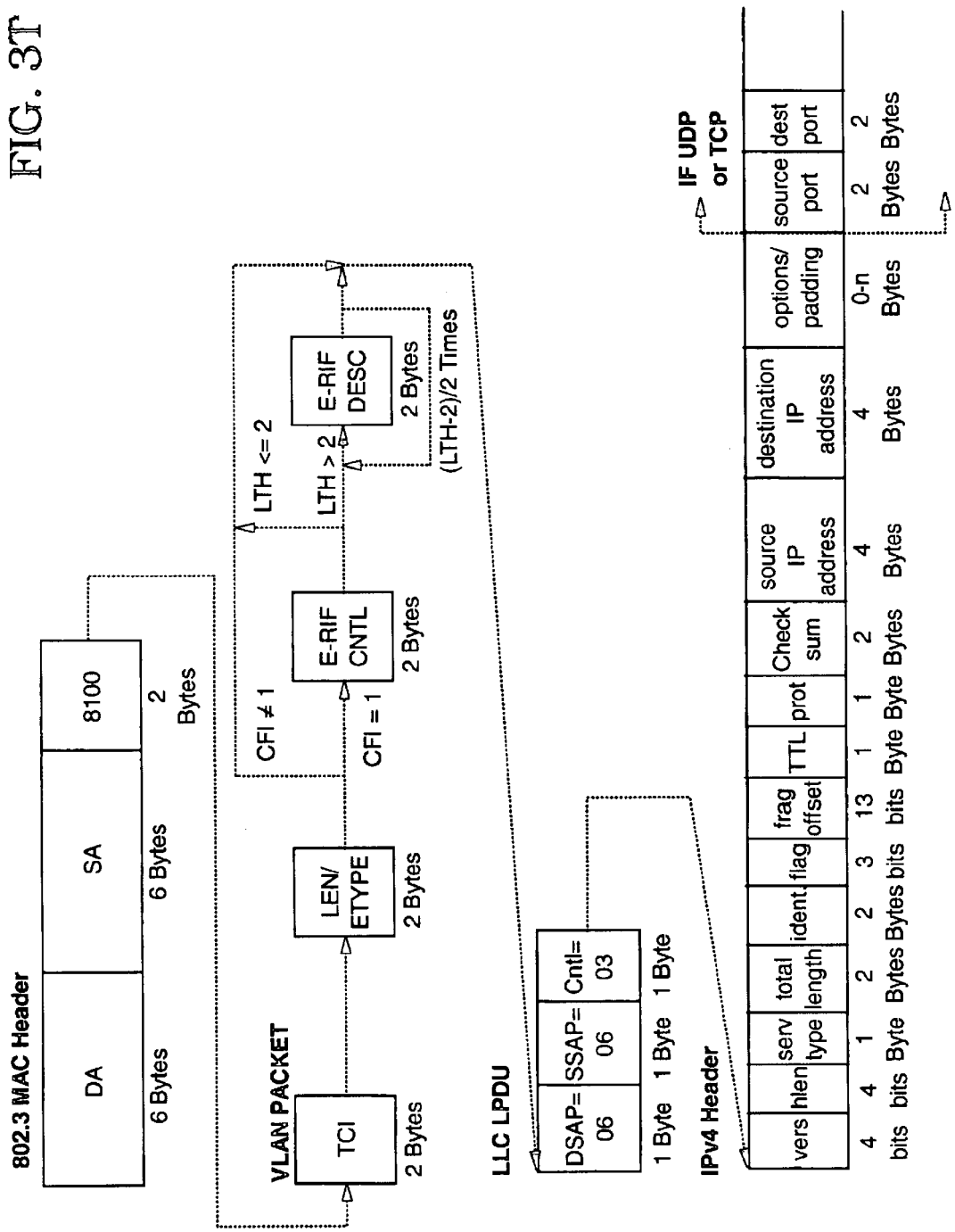

METHOD AND SYSTEM FOR FRAME AND PROTOCOL CLASSIFICATION

CROSS REFERENCE TO RELATED PATENTS

The present invention is related to the following documents, all of which are assigned to the assignee of the present invention and which are specifically incorporated herein by reference:

Patent application Ser. No. 09/384,691, filed Aug. 27, 1999 by Brian Bass et al., entitled "Network Processor Processing Complex and Methods", sometimes referred to herein as the Network Processing Unit Patent or NPU Patent.

U.S. Pat. No. 5,724,348 entitled "Efficient Hardware/Software Interface for a Data Switch" issued Mar. 3, 1998, which patent is sometimes referred to as the Interface Patent.

U.S. patent application Ser. No. 09/330,968 filed Jun. 11, 1999 and entitled "High Speed Parallel/Serial Link for Data Communications", sometimes referred to as the Link Patent.

Various patents and applications assigned to IBM for its multiprotocol switching services, sometimes referred to as "MSS", some of which include Cedric Alexander as an inventor, and are sometimes referred to as the MSS Patents.

BACKGROUND OF THE INVENTION

1. Field of the Invention

The present invention relates to communication network apparatus such as is used to link together information handling systems or computers of various types and capabilities and to components and methods for data processing in such an apparatus. The present invention includes an improved system and method for frame and protocol classification in an information handling or data processing system. More particularly, the present invention involves routing data packets which can have one of a variety of different protocols by quickly identifying the protocols and providing key information on the packet for use by other portions of the system in further processing data from the packet.

2. Background Art

The description of the present invention which follows is based on a presupposition that the reader has a basic knowledge of network data communications and the routers and switches which are useful in such network communications. In particular, this description presupposes familiarity with the International Standards Organization ("ISO") model of network architecture which divides network operation into layers. A typical architecture based on the ISO model extends from a Layer 1 (which is sometimes referred to a "L1") being the physical pathway or media through which signals are passed upward through Layers 2 (or "L2"), 3 (or "L3"), and so forth to Layer 7 which is the layer of application programming resident in a computer system linked to the network. Throughout this document, references to such layers as L1, L2, L3 are intended to refer to the corresponding layer of the network architecture. The present description also is based on a fundamental understanding of bit strings used in network communication known as packets and frames.

Bandwidth considerations (or the amount of data which a system can handle in a unit of time) are becoming important in today's view of network operations. Traffic over networks is increasing, both in sheer volume and in the diversity of the traffic. At one time, some networks were used primarily for a certain type of communications traffic, such as voice on a telephone network and digital data over a data transmission network. Of course, in addition to the voice signals, a telephone network would also carry a limited amount of "data" (such as the calling number and the called number, for routing and billing purposes), but the primary use for some networks had, at one point in time, been substantially homogenous packets.

A substantial increase in traffic has occurred as a result of the increasing popularity of the Internet (a public network of loosely linked computers sometimes referred to as the worldwide web or "www.") and internal analogs of it (sometimes referred to as intranets) found in private data transmission networks. The Internet and intranets involve transmission of large amounts of information between remote locations to satisfy an ever-growing need for remote access to information and emerging applications. The Internet has opened up to a large number of users in geographically dispersed areas an exploding amount of remote information and enabled a variety of new applications, such as e-commerce, which has resulted in a greatly-increased load on networks. Other applications, such as e-mail, file transfer and database access-further add load to networks, some of which are already under strain due to high levels of network traffic.

Voice and data traffic are also converging onto networks at the present time. Data is currently transmitted over the Internet (through the Internet Protocol or IP) at no charge, and voice traffic typically follows the path of lowest cost. Technologies such as voice over IP (VoIP) and voice over asynchronous transfer mode or ATM (VoATM) or voice over frame relay (VoFR) are cost-effective alternatives for transmission of voice traffic in today's environment. As these services migrate, the industry will be addressing issues such as the changing cost structure and concerns over the trade off between cost of service and quality of service in the transmission of information between processors.

Aspects of quality of service include the capacity or bandwidth (how much information can be accommodated in a period of time), the response time (how long does it take to process a frame) and how flexible is the processing (does it respond to different protocols and frame configurations, such as different encapsulation or frame header methods). Those using a resource will consider the quality of service as well as the cost of service, with the tradeoffs depending on the situation presented.

Some prior art systems which route data packets require that the packets be of a single protocol or format, or one of a limited number of such protocols 6r formats which are permitted. Such a system has advantages of increased speed and responsiveness because of the relative simplicity of the design when packets of only one type of protocol (or a limited number of protocols) are found in the system, since the system can be tailored for that the permitted protocol(s). When the entire data transmission system was under the control of a single entity, it was easy for the controlling entity to enforce a single standard transmission protocol on users (either users followed the permitted protocol(s) or didn't use the network, because the network was programmed to accommodate only the specified protocol(s) and could not handle variations in the protocols, even seemingly minor variations).

However, frames from even a communications "standard" like Ethernet can be formatted using one of several protocols and can be encapsulated into a message using different encapsulation techniques. These different protocols and encapsulation technique provide a varying amount of data, typically at the beginning of a frame and before other key information such as the beginning of the L3 message. Thus, key information from an Ethernet frame can be located in different places within the frame, depending on the Ethernet L3 protocol or form of Ethernet and the encapsulation technique, if one is present. A system which provides processing of the L3 message needs to find it first, and that can be a challenge in a multi-protocol system. So, for example, Ethernet DIX Version 2 differs from Ethernet 802.3, IPX over Ethernet differs from IPX over Ethernet 802.3 which itself has three different formats (Novell Proprietary, LLC and SNAP). Further, each version of IPX may or may not support a virtual LAN (or VLAN) using the so-called IEEE 802.1q standard, which also has the effect of changing the format of the frame, and thus the location of the L3 message.

In those prior systems in which frames in a multitude of protocols were supported, it was sometimes necessary to provide a significant amount of overhead (such as computer programming sometimes including more than one hundred lines of code with comparisons and branching instructions) to identify the protocol and to translate a frame from one protocol to another, or to remove unnecessary information (such as encapsulation information) from a frame. Such multiple protocol processing was also time consuming to use these prior systems of translation techniques, and further, it took a variable amount of time to identify the protocol using software techniques. When such systems required a variable amount of time to identify the protocol and provide the necessary processing, the system would have to be configured to allow the longest time necessary (to handle the worst case), slowing down the processing of all frames to the worst case or having the possibility that some frames would not be processed in the time allowed for categorization.

Most processors start processing from a common beginning of an instruction set (the same place for all data) and set flags which the processor reads selectively when it needs to determine where to go and which instructions to execute. Thus, the execution of many processors performs a number of tests to determine what kind of data it has and where to begin the substantive processing, tests which involve a number of cycles and could involve a lot of processing.

Thus, the prior art systems for handling data packets had undesirable disadvantages and limitations which had an effect either on the versatility of the system or the speed with which it could operate.

SUMMARY OF THE INVENTION

The present invention overcomes the disadvantages and limitations of the prior art systems by providing a simple, yet effective, way of handling frames or packets which were created using one of a plurality of different permitted message protocols and which may or may not employ a virtual local area network (or VLAN) system. By analyzing each packet or frame in a quick and efficient manner, the type of frame and key characteristics of the frame can be determined and saved for future reference and processing regarding that frame, for example, in a network processor of the type described in the NPU Patent referenced above.

It is an advantage of the present invention that it is quick and efficient in the handling of packets having different protocols and provides for faster and easier processing of the packets, allowing the entire system to operate at a high rate of frame processing.

The present invention allows a router or switch to process successive packets or frames in varying formats without knowing in advance in what format the particular frame or packet was created. This invention includes identifying the layer 2 (L2) encapsulation format of the message or packet and then applying stored rules to identify the L2 encapsulation, the L3 protocol and the presence of a virtual local area network (VLAN). As a result of such determination, the processor is ready to run at a starting instruction address; that is, the processor is preconditioned with the instruction's starting address which is based on the identification of the frame. The processor thus has a starting instruction address as well as a pointer to the beginning of the L3 header in the data portion of the frame as well as flags indicating the protocol, VLAN presence and the encapsulation format.

The present invention has the advantage that it sets up and stores key information about a packet during the initial processing of the packet, then that stored information about the packet or frame can be used later in the processing to advantage, allowing quicker and more efficient processing of the packet in its later stages, for example, by network processing unit complexes described in the NPU Patent. This key information includes, in the preferred embodiment, the beginning location of the L3 message and the starting address in the instruction set for processing the frame.

The present invention contemplates that it can be implemented on the same semiconductor substrate as an array of network processor and their associated storage components, allowing for fast data transmission between the components.

The present invention also has the advantage that it can be implemented in hardware, rather than software, and that the tests can be completed in a uniform time regardless of the format and how many comparisons must be made before the format or encapsulation techniques is determined. In the design shown, within two cycles of the clock, the classification of a frame can be completed, with the necessary indicators set to indicate what kind of a frame is present (e.g., what encapsulation technique and what layer 3 protocol were used) and whether a virtual LAN (or VLAN) is supported as well as key information about the frame. During the same two cycles, a frame can be routed by a dispatcher to an idle network processing unit (as described in the referenced NPU Patent). As a result of the processing of the frame to determine the protocol and encapsulation method, a starting address for the processor can be determined and passed to the processor so that the processor can begin its work on the frame, pre-loaded with the starting address (a pointer to the relevant instruction storage) and other relevant information for its processing. This preloading of the processor with a starting address for processing is sometimes referred to as preconditioning of the processor and enables processor efficiency—it need not go through a number of test instructions and jump instructions based on the results of the test, but instead starts at the initial address for the particular format of message presented.

The system of the present invention also has the advantage that the classification and preprocessing of a frame can occur in parallel with the distribution of that frame to a network processing complex. This parallel processing allows for more efficient handling of frames and allows the system to operate faster.

One enhancement to the present invention allows not only the preconditioning of the processor (storing the address of the first instruction) but also storing of additional address of instructions for later execution. In this way, the processor has the address of the first instruction and also the address for instructions at later branch (or fork) points, avoiding unnecessary testing (if condition, then go to instruction #1 otherwise go to instruction #2) in the execution of the code. This allows the code to execute more efficiently.

Other objects and advantages of the present invention will be apparent to those skilled in the relevant art in view of the following description of the preferred embodiment, taken together with the accompanying drawings and the appended claims.

BRIEF DESCRIPTION OF THE DRAWINGS

Having thus set forth some of the limitations and disadvantages of the prior art and some objects and advantages of the present invention, other objects and advantages will be apparent to those skilled in the relevant art in view of the following description of the drawings illustrating the present invention of an improved routing system and method in which.

DETAILED DESCRIPTION OF THE PREFERRED EMBODIMENT

In the following description of the preferred embodiment, the best implementations of practicing the invention presently known to the inventors will be described with some particularity. However, this description is intended as a broad, general teaching of the concepts of the present invention in a specific embodiment but is not intended to be limiting the present invention to that as shown in this embodiment, especially since those skilled in the relevant art will recognize many variations and changes to the specific structure and operation shown and described with respect to these figures.

Figure 1:
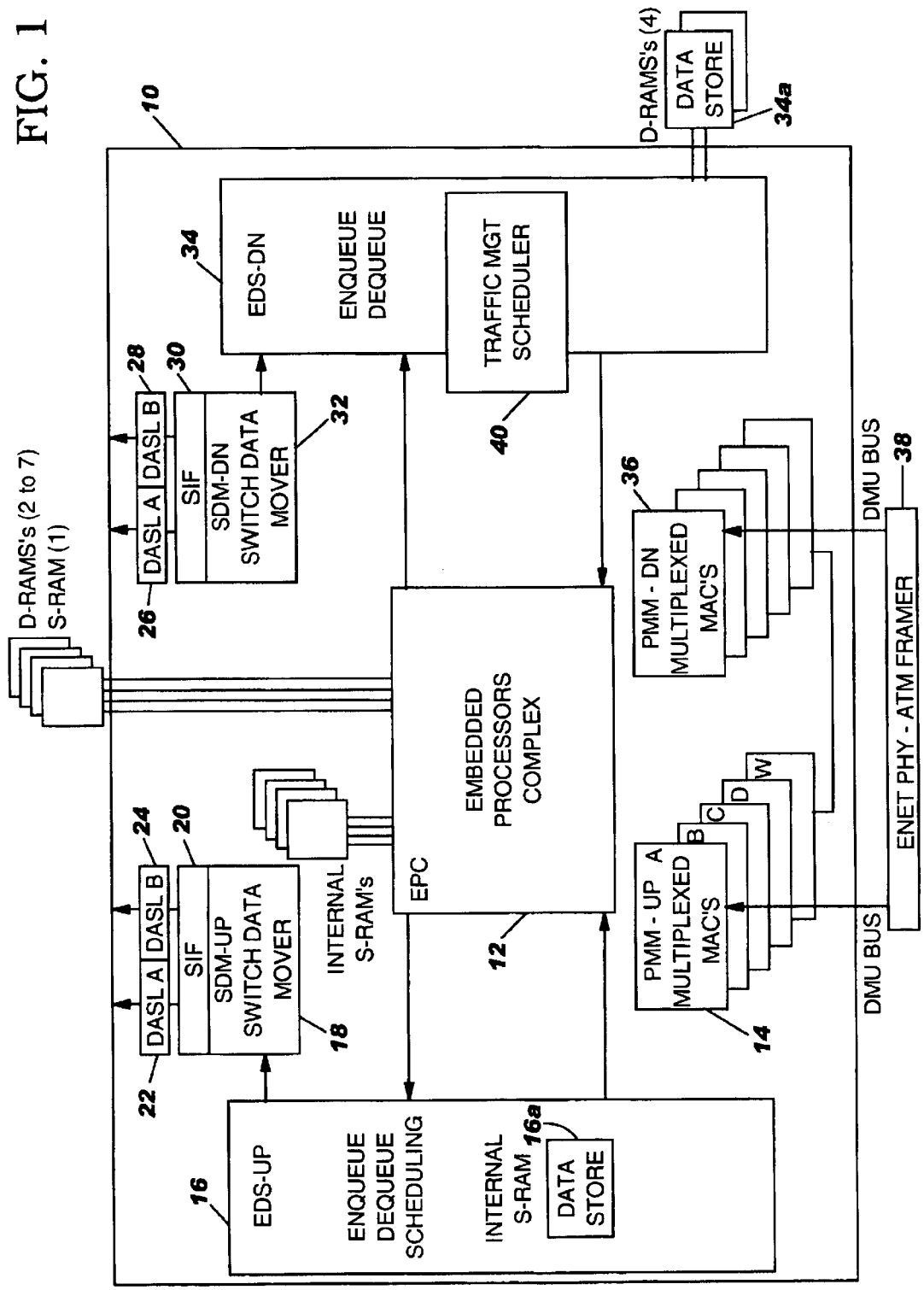
FIG. 1 is a block diagram for an interface device including embedded processor complex which is described in the NPU patent and is useful in practicing the present invention.

FIG. 1 shows a block diagram of the interface device chip that includes the substrate 10 and a plurality of subassemblies integrated on the substrate. The sub-assemblies are arranged into an upside configuration and a downside configuration, with the "upside" configuration (sometimes also referred to as an "ingress") referring to those components relating to data inbound to the chip from a data transmission network (up to or into the chip) and "downside" (sometimes referred to as an "egress") referring to those components whose function is to transmit data from the chip toward the data transmission network in an outbound fashion (away from the chip or down and into the network). Data flows follow the respective arrangements of the upside and downside configurations; thus, there is a upside data flow and a downside data flow in the system of FIG. 1. The upside or ingress configuration elements include an Enqueue-Dequeue-Scheduling UP (EDS-UP) logic 16, multiple multiplexed MAC's-UP (PMM-UP) 14, Switch Data Mover-UP (SDM-UP) 18, System Interface (SIF) 20, Data Align Serial Link A (DASL-A) 22 and Data Align Serial Link B (DASL-B) 24. Data links are more fully described in the Link Patent referenced above, and reference should be made to that document for a greater understanding of this portion of the system. It should be understood that the preferred embodiment of the present invention uses the data links as more fully described in that patent, other systems can be used to advantage with the present invention, particularly those which support relatively high data flows and system requirements, since the present invention is not limited to those specific auxiliary devices such as the data links which are employed in the preferred embodiment.

The components depicted on the downside (or egress) of the system include data links DASL-A 26 and DASL-B 28, system interface SIF 30, switch data mover SDM-DN 32, enqueue-dequeue-scheduler EDS-DN 34 and multiple multiplexed MAC's for the egress PMM-DN 36. The substrate 10 also includes a plurality of internal static rendom access memory components (S-RAM's), a traffic management scheduler (TRAFFIC MGT SCHEDULER) 40 and an embedded processor complex 12 described in greater depth in the NPU Patent referenced above. An interface device 38 is coupled by the respective DMU busses to PMM 14, 36. The interface device 38 could be any suitable apparatus for connecting to the L1 circuitry, such as Ethernet physical (ENET PHY) devices or asynchronous transfer mode framing equipment (ATM FRAMER), both of which are examples of devices which are well known and generally available for this purpose in the trade. The type and size of the interace device are determined, at least in part, by the network media to which the present chip and its system are attached. A plurality of external dynamic random access memory devices (D-RAM) 34a and a S-RAM 16a are available for use by the chip.

While here particularly disclosed for networks in which the general data flow outside the relevant switching and routing devices is passed through electric conductors such as wires and cables installed in buildings, the present invention contemplates that the network switches and components thereof could be used in a wireless environment as well. For example, the media access control (MAC) elements herein disclosed may be replaced with suitable radio frequency devices, such as those made from silicon germanium technology, which would result in the connection of the device disclosed directly to a wireless network. Where such technology is appropriately employed, the radio frequency elements can be integrated into the VLSI structures disclosed herein by a person of skill in the appropriate arts. Alternatively, radio frequency or other wireless response devices such as infrared (IR) response devices can be mounted on a blade with the other elements herein disclosed to achieve a switch apparatus which is useful with wireless network apparatus.

The arrows show the general flow of data within the interface system shown in FIG. 1. Frames of data or messages (also sometimes referred to as packets or information units) received from an Ethernet MAC 14 off the ENET PHY block 38 via the DMU bus are placed in internal data store buffers 16a by the EDS-UP device 16. The frames may be identified as either normal frames or guided frames, which then relates to method and location of the subsequent processing in the plurality of processors.

Figure 2:
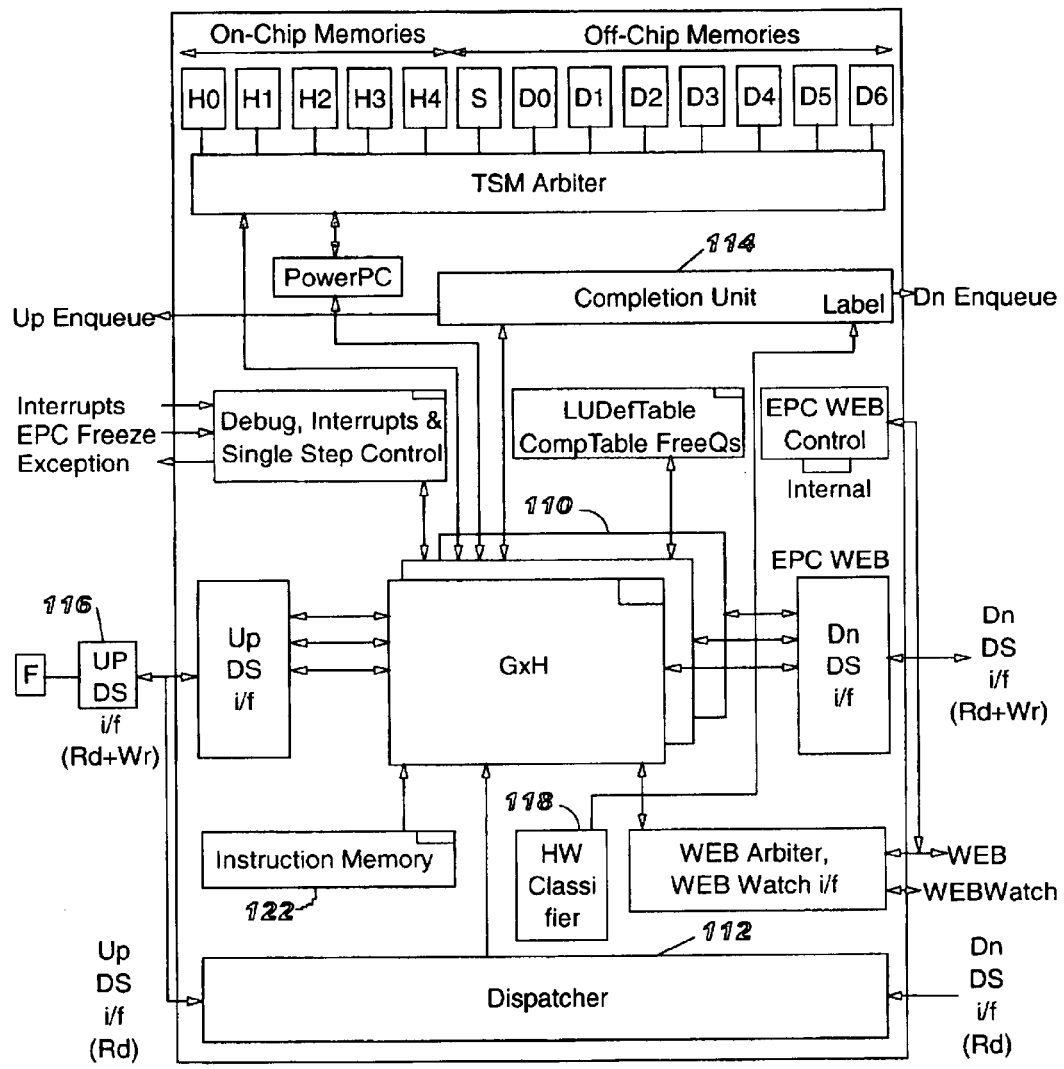
FIG. 2 is a block diagram of an embedded processor complex of type shown in FIG. 1, with a classifier hardware assist useful in the present invention.

FIG. 2 is a block diagram of a processing system 100 which can employ the present invention to advantage. In this FIG. 2, a plurality of processing units 110 are located between a dispatcher unit 112 and a completion unit 114. Each incoming frame F (from a network, not shown, attached to the present data processing system) is received and stored into an UP data store 116, then sequentially removed by the dispatcher 112 and assigned to one of the plurality of processing units 110, based on a determination by the dispatcher 112 that the processing unit is available to process the frame. This indication could be that the one processing unit to which the frame F is assigned has sent a signal to the dispatcher 112 indicating that that particular processing unit was idle and available for work, although alternate methods of assigning work (such as a round-robin allocation or a least recently used algorithm) could also be employed to advantage in the present system. Greater detail on the structure and function of the processing units 110 in particular, and the processing system in general, can be found in the NPU Patent references above.

Interposed between the dispatcher 112 and the plurality of processing units 110 is a hardware classifier assist 118 as will be described in greater detailed later in this document, particularly in connection with FIGS. 4 and 5. Also associated with the plurality of processing units 110 is an instruction storage 122 where a plurality of different instruction sets are stored for retrieval and execution by the individual processing units 110. As will be described later, the starting instruction in the instruction storage 122 is addressed in accordance with an address which is based on the type of message—its protocol and encapsulation method—as determined by the hardware classifier assist 118.

FIG. 3 (consisting of its various sub-illustrations, FIGS. 3A–3T) depicts a plurality of message formats (components and variations on the Ethernet message format) which the present processing system is programmed to accept and process, although the repertoire of message or frame formats is something that can be varied by those skilled in the art to fit the environment of the system under consideration. The present system can also be redesigned to accept other message formats, including those message formats and variations which may be designated in the future. As such, the message formats of FIG. 3 are for the purpose of illustration of different formats of frames with different protocol and encapsulation types, and the present invention is a flexible system designed to accept various different protocol and encapsulation formats and to provide an assist to the processing of those frames by providing a pointer to the type of encapsulation and protocol and to provide a starting address in the instruction storage for the processor handling a given frame.

Figure 3A:
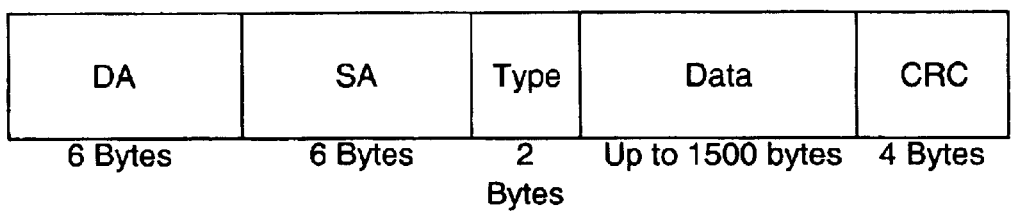
FIGS. 3A–3T are diagrams illustrating the various Ethernet protocol formats used in the hardware classifier of the present invention.

FIG. 3A illustrates the generic or base Ethernet message format, which is sometimes called Ethernet Version 2.0/ DIX. This is a message format where the message includes a destination address DA, a source address SA, a block indicating the type of message (Type), the message text or data, and a trailer for cyclical redundancy checking or CRC for message integrity verification. The destination address DA and the source address SA are both specified as 6 bytes (48 bits) and the block indicating Type is specified as 2 bytes, while the CRC trailer is specified as 4 bytes. In general, the rest of the message—the Data—can be of any length, up to 1500 bytes, although, as will be seen later, some types of Ethernet provide limits on this flexibility to achieve other advantages. The source address SA can indicate either that the message is an individual message, destined for a single network address on one node on the network or that it is a multicast or a broadcast message. A multicast message is directed to a group of nodes on the network and a broadcast is directed to all stations. The block indicating Type is 16 bits which identifies the higher layer protocol which is used. Each registered Ethernet protocol is given a unique type code, a value which is always greater than the maximum value in the length field of the Ethernet 802.3 length field, to allow the field to coexist. The data field is typically from 46–1500 bytes in length, assuming that the upper layers will ensure that the minimum field length of 46 bytes is met prior to passing data to the MAC layer. Messages which are longer than the allowed length of a frame must be split into a plurality of messages which are shorter than the maximum allowed length of the data field.

Figure 3B:
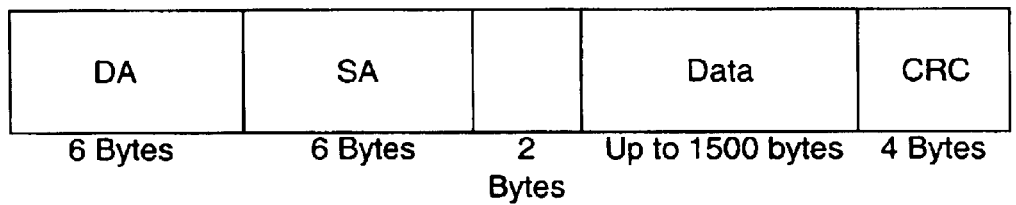

FIG. 3B illustrates a variation on the general Ethernet style which is referred to as the IEEE 802.3 Ethernet format. It is similar to the format of the generic Ethernet message format of FIG. 1, except that the type field is replaced by a length field LEN, which is 16 bits which indicates the length of the data field which follows, excluding any pad. This standard imposes a minimum size length of the packet as 64 bytes, so the data field Data must be at least 46 bytes. If the actual data for the data field Data is less than 46 bytes, then the MAC layer must add place savers (padding characters) to the LLC data field to make the minimum size before sending the packet over the network. However, the length field is the length without the padding characters, which allows a receiving system to identify and disregard any padding characters which have been added.

Figure 3C:
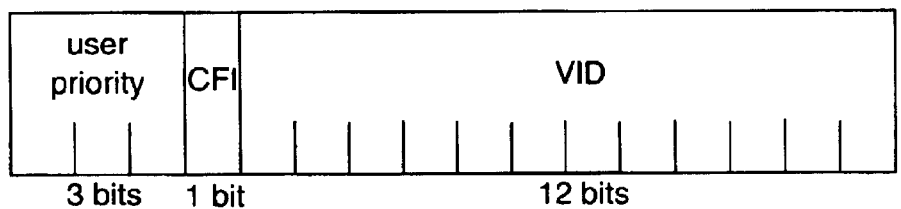

FIG. 3C illustrates a Tag Control Information Format for the Ethernet messages, particularly with reference to the IEEE standard 802.1q. It consists of 3 bits of user priority, 1 bit of Canonical Format Indicator or CFI and 12 bits of VID or Virtual LAN (or VLAN) Identifier. A virtual LAN or local area network is an identification of a group of nodes which have been identified as a virtual local area network by defining the addresses as comprising a VLAN, allowing those nodes which are not physically associated to be logically associated and addressed as a group, rather than individually.

Figure 3D:
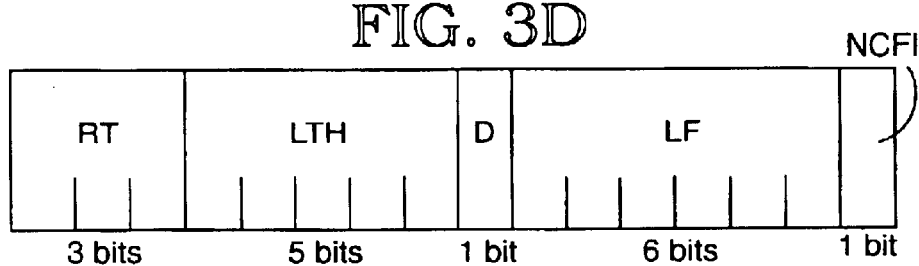

FIG. 3D illustrates an Embedded RIF (or E-RIF) format which is used in some Ethernet protocol message formats, again following IEEE standard 802.1q. In this format, a route type RT is indicated by the first 3 bits, a length LTH by the next 5 bits (indicating the length in bytes of the total E-RIF portion, including the E-RIF route control and E-RIF Route Descriptor), and a route descriptor direction D by one bit (normally a "0" indicating to traverse the route descriptor in forward order, but it is a "1" in some specially routed frames to indicate that the route descriptor is in reverse order). The E-RIF format includes a largest frame indicator of 6 bits and a Non Canonical Format Indicator (NCFI) of 1 bit. The route type RT is either 00X, 01X, 10X or 11X to indicate that the frame is either a specially routed frame, a transparent frame, all route explorer frame or a spanning tree explorer frame, respectively. The largest frame LF field is 1470 bytes or less, according to the IEEE 802.3 Standard for Ethernet. The NCFI indicates either that the MAC addresses specified are in the non-canonical form (if 0) or in canonical form (if 1).

Figure 3E:
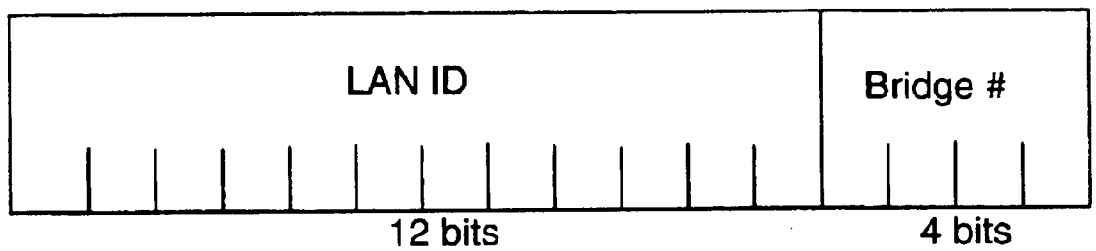

FIG. 3E illustrates the E-RIF Route Descriptor Format as including a local area network identification LAN ID of 12 bits and a bridge number (Bridge#) of 4 bits. An E-RIF Route Descriptor Format field is also well known in the industry and this usage follows the standard for such fields.

Figure 3F:
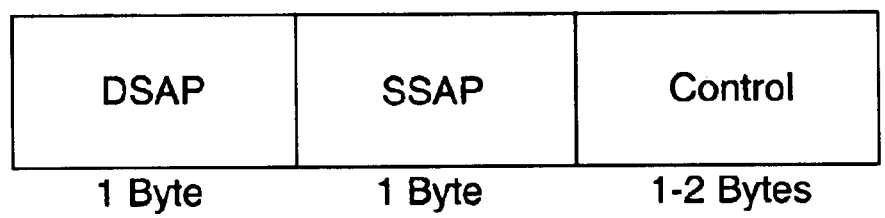
Figure 3G:
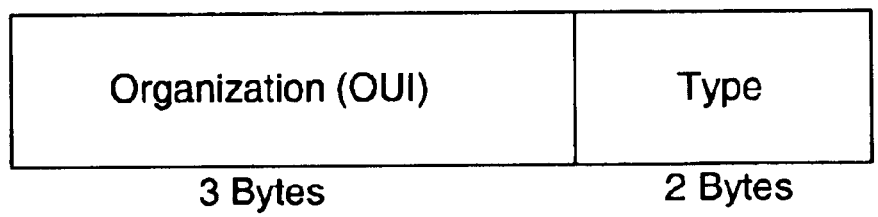

FIG. 3F and FIG. 3G illustrate components of LLC formats for use in an Ethernet message, including an 802.2 LPDU format in FIG. 3F and a Generic SNAP format in FIG. 3G. The LPDU format of FIG. 3F includes a Destination Service Access Point DSAP of 1 byte (8 bits), a Source service access point SSAP of 1 byte and a control field Control of 1–2 bytes including command(s), response(s), sequence number(s) and poll/final bits. In this context, a service access point is 6 bits plus a U bit and a final bit (an individual 1 bit for the destination service access point and a C bit for command/response indicator for the source). FIG. 3G illustrates the SNAP format, including three bytes indicating the organization (the Organizationally Unique Identifier, or OUI) and two bytes indicating the type assigned to the format under Internet Standard 0002. Examples of the type field are 0800 for IP, 8137 for IPX, 0806 for ARP, 8035 for RARP, 8100 for 802.1q VLAN, 86DD for IPv6, 80DB for Appletalk and 80F3 for Appletalk AARP.

Figure 3H:
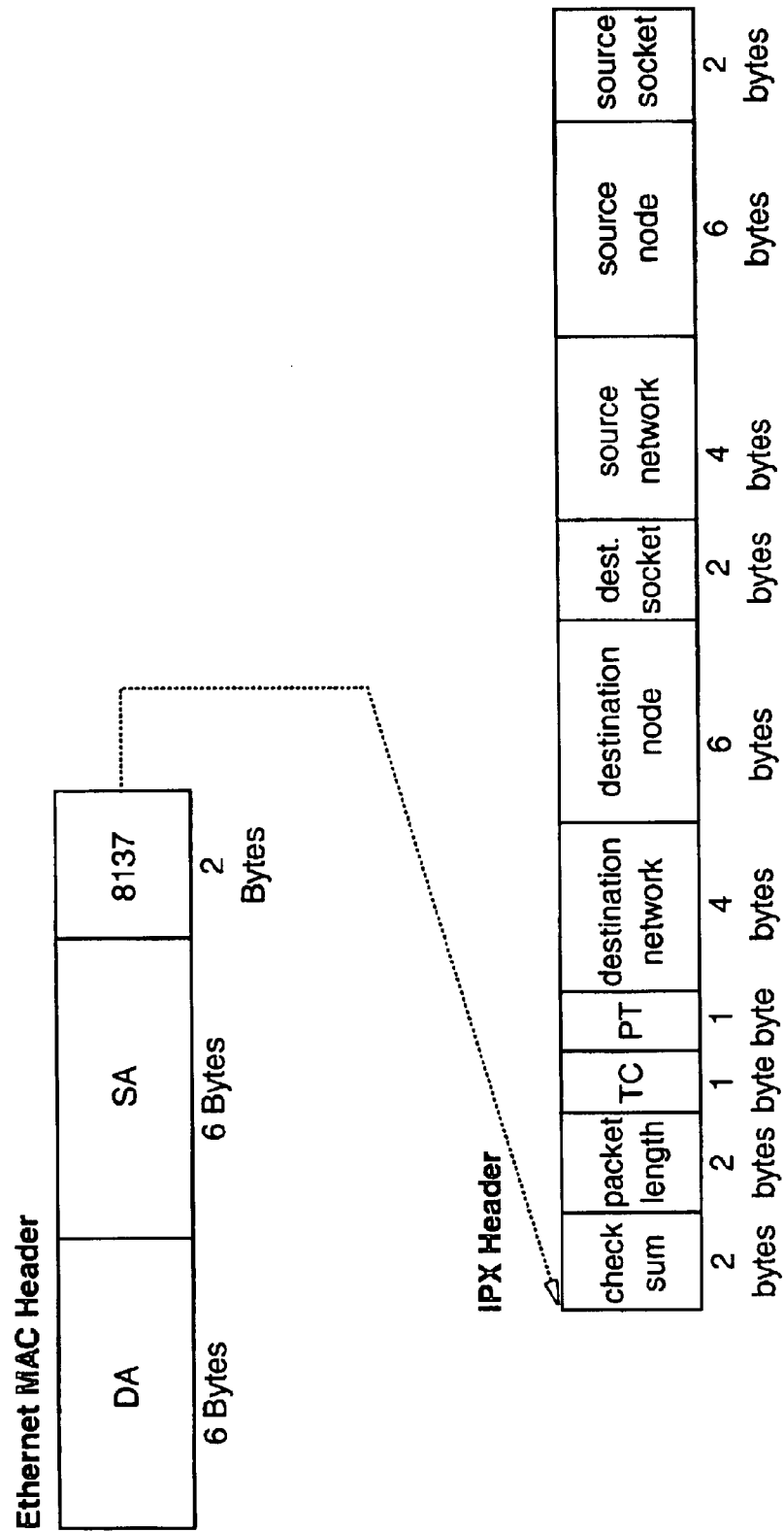

FIG. 3H illustrates the format of a message in the IPX over Ethernet format including an Ethernet MAC header and an IPX header, with the Ethernet MAC header having a source address SA and a destination address DA of 6 bytes each, followed by a two byte type of 8137 indicating that this frame is of the IPX format. The IPX header then includes the components indicated, namely 2 bytes for a check sum, 2 bytes for the packet length, 1 byte for TC, 1 byte for PT, 4 bytes for the destination network, 6 bytes for the destination node, 2 bytes for the destination socket, 4 bytes for the source node, 6 bytes for the source node and 2 bytes for the source socket.

Figure 3I:
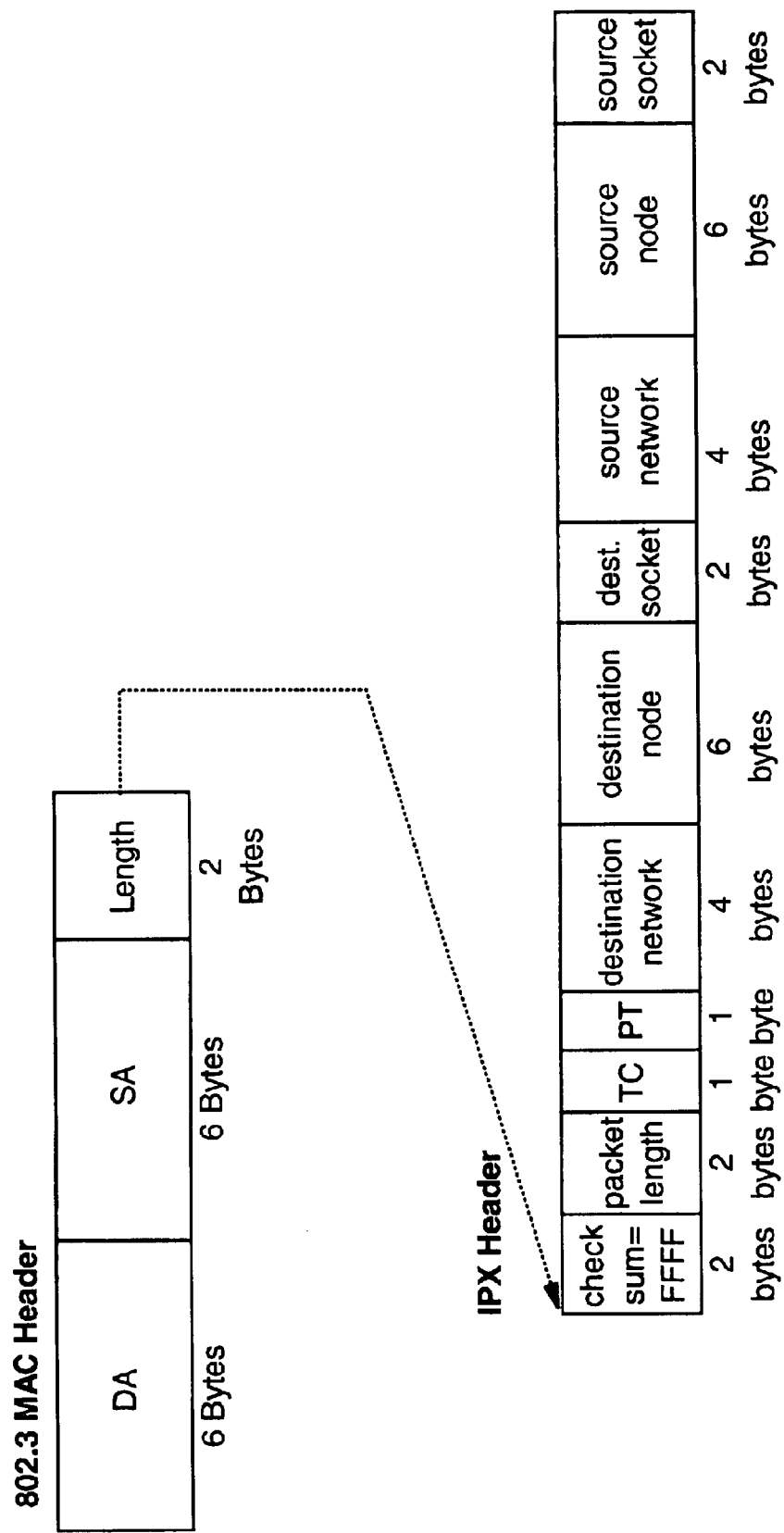

FIG. 3I shows the message format for IPX over a proprietary version of Ethernet 802.3 (sometimes referred to as a Novell format) including an Ethernet 802.3 MAC header where the length of the message is specified in the third field (rather than a type in the IPX over Ethernet shown in FIG. 3H). The check sum in this format is set to "FFFF" according to its protocol.

Figure 3J:
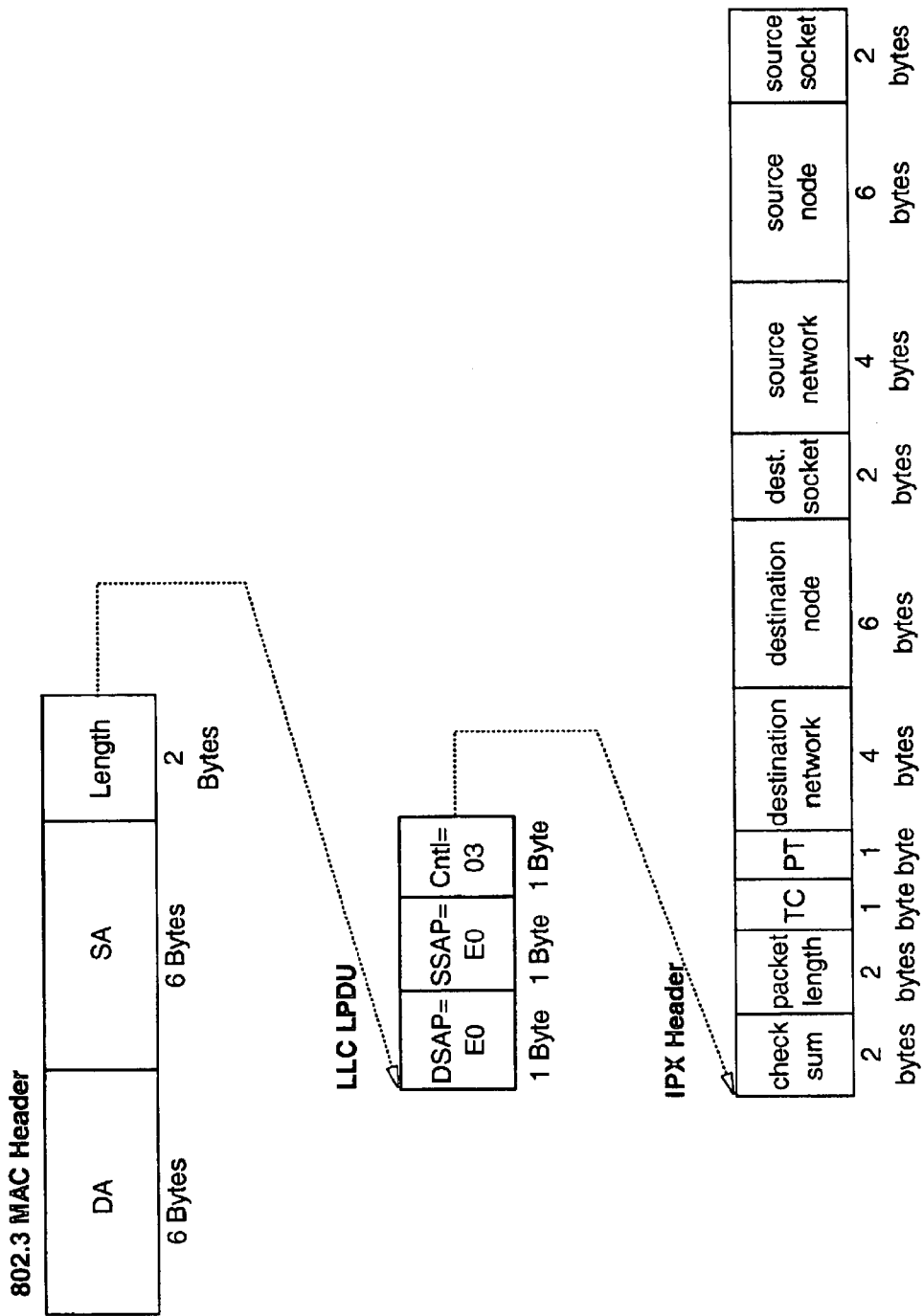

FIG. 3J illustrates an IPX over Ethernet 802.3 with 802.2, where the message includes a MAC header with an IPX header (like those shown in FIG. 3H) separated by the LLC LPDU fields for the 802.2.

Figure 3K:
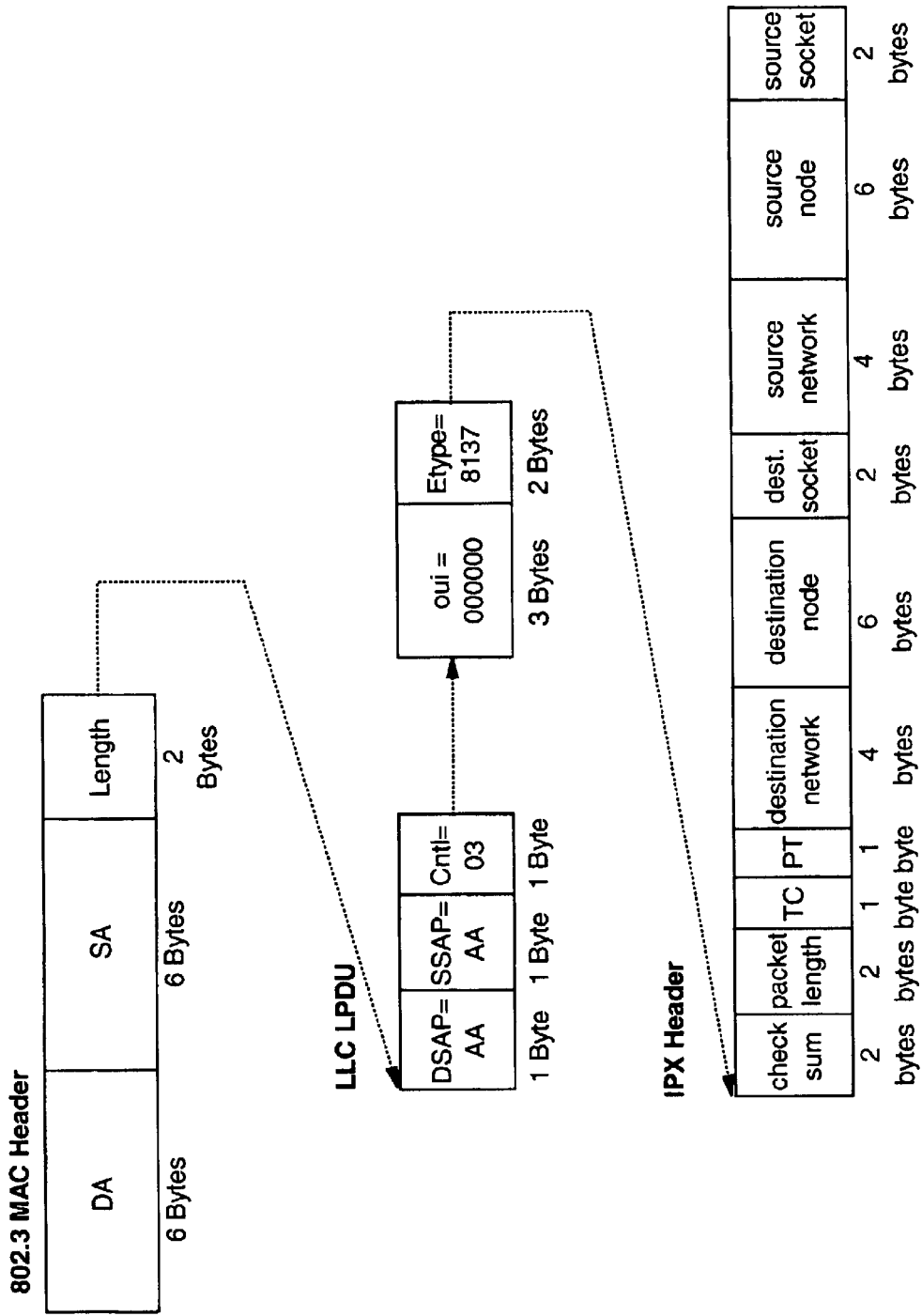

FIG. 3K illustrates the format of an IPX frame over 802.3 with SNAP where, like the format described in connection with FIG. 3J, the message includes an 802.3 MAC header, followed by the LLC LPDU field and concluding with the IPX header. Disposed between the LLC LPDU portion and the IPX header is the SNAP field for indicating the OUI and an Etype of 8137.

Figure 3L:
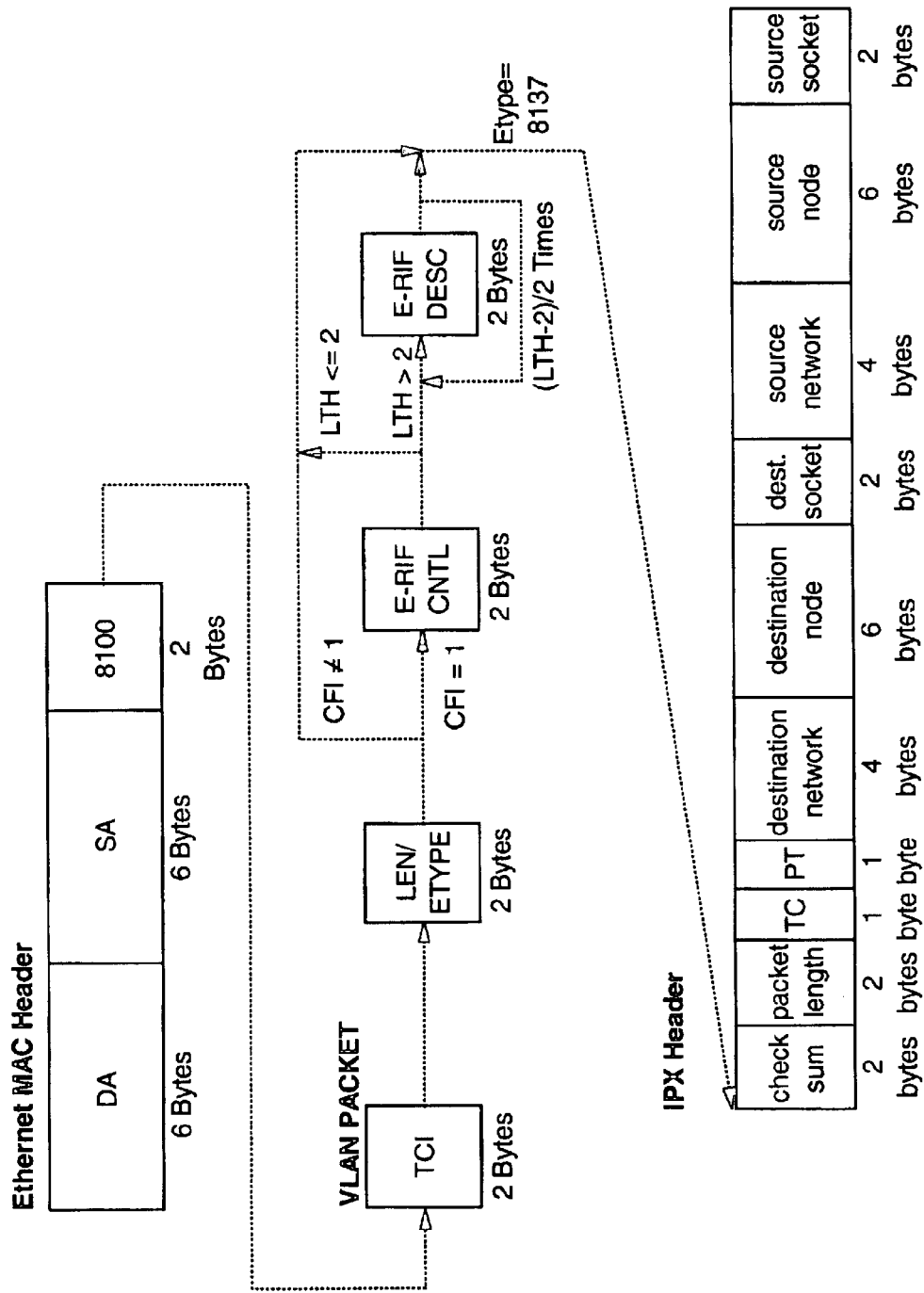

FIG. 3L illustrates the format of an IPX over Ethernet with 802.1q VLAN support, where the type field is indicated as 8100 and the VLAN packet is disposed between the Ethernet MAC header and the IPX header (the IPX header being in the same format as described in connection with FIGS. 3H, 3J and 3K above). The VLAN packet includes the TCI field of 2 bytes and a length LEN or e-type field of 2 bytes, then a e-rif control field and a variable number of e-rif descriptor fields, the number of which being indicated by the formula (LEN-2)/2.

Figure 3M:
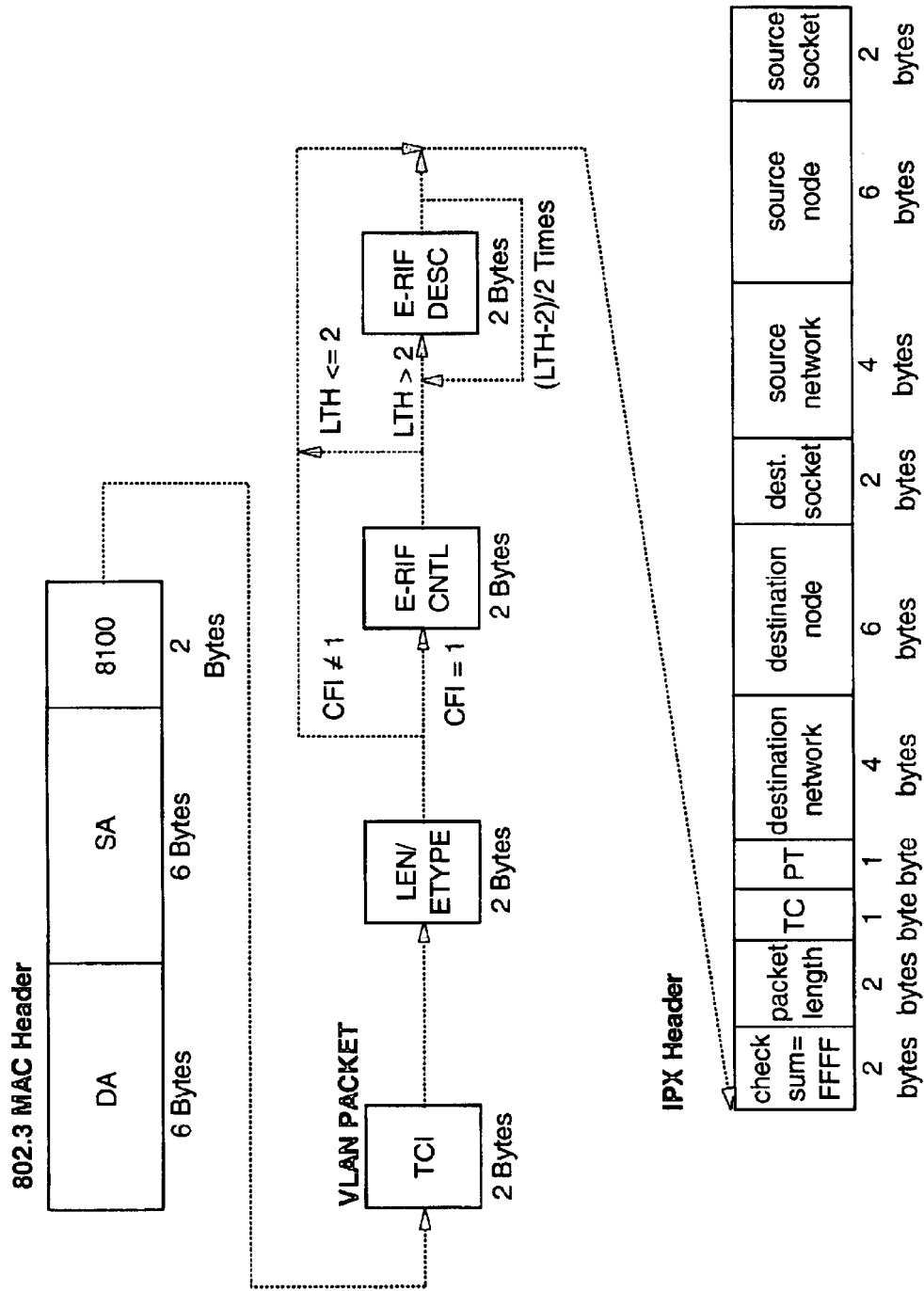

FIG. 3M illustrates the format for an IPX over Ethernet 802.3 (proprietary) using 802.1q VLAN support. The type field is 8100 and the VLAN Packet is similar to that in the previous VLAN example, FIG. 3L. The IPX header is similar to that shown in the earlier 802.3 proprietary frame, FIG. 3I, with the checksum field set equal to "FFFF".

Figure 3N:
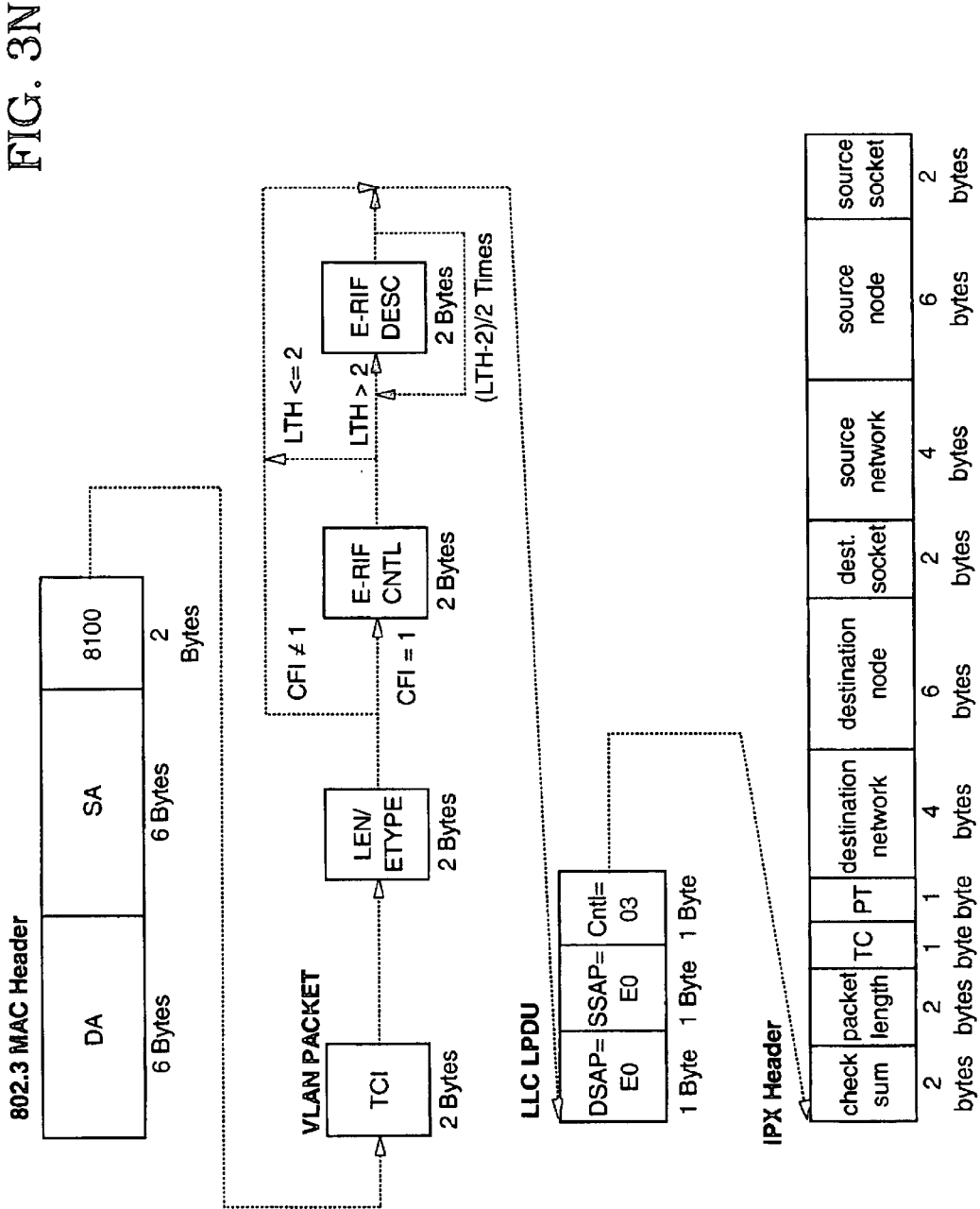
Figure 30:
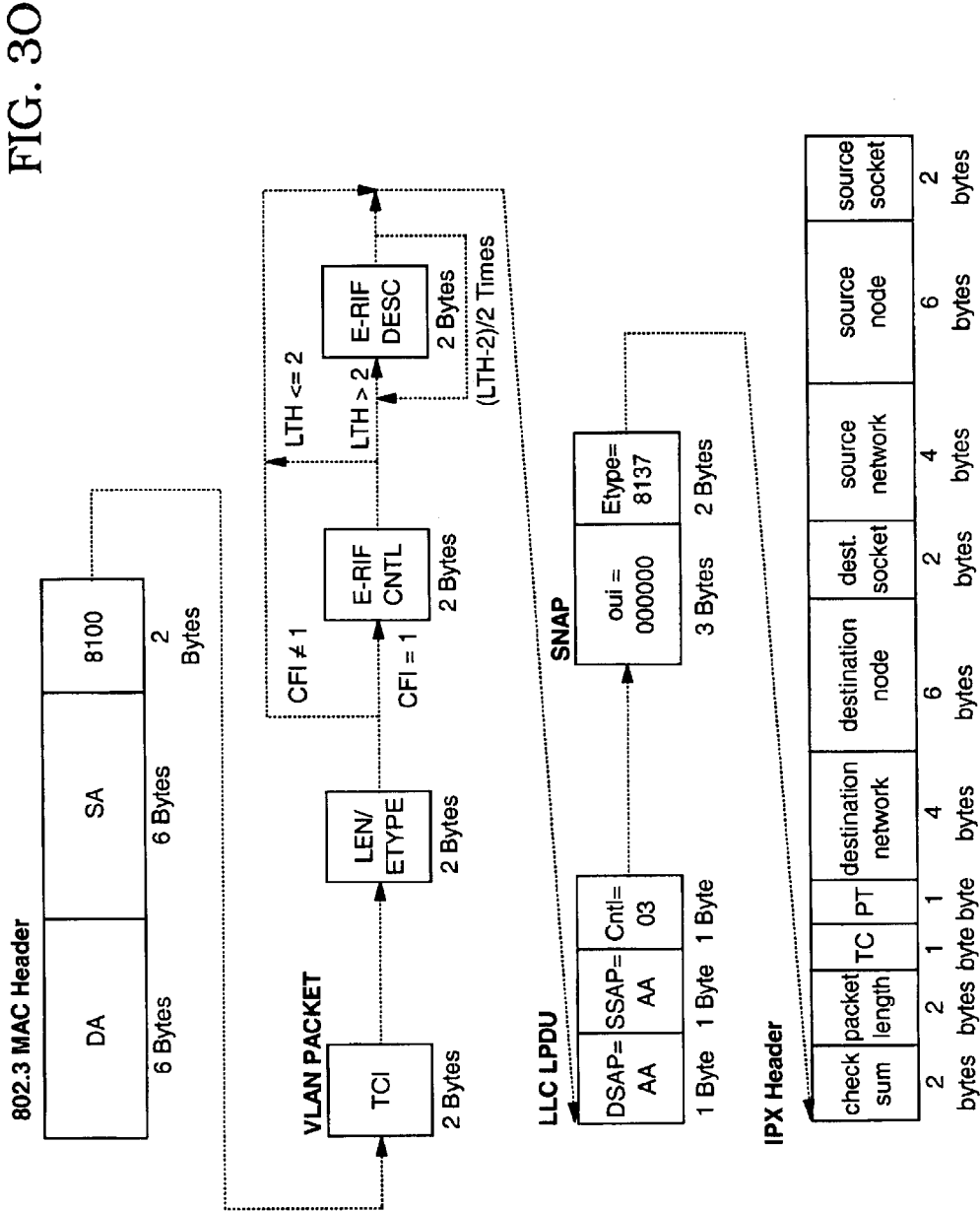

FIG. 3N shows the frame arrangement for a frame using the IPX over Ethernet 802.3 with VLAN support. It includes a 802.3 MAC Header with a type of 8100 indicating the presence of a VLAN packet (like FIG. 3M), a VLAN Packet (also in a format like FIG. 3M), an LLC LPDU (similar to that shown and described in connection with FIG. 3J), and an IPX header (as shown in FIG. 3H).

FIG. 3O shows the configuration or format of a message in the IPX over Ethernet 802.3 with SNAP and VLAN support using 802.1q. It is similar to the format of FIG. 3N, with the addition of a SNAP field between the LLC LPDU field and the IPX Header.

Figure 3P:
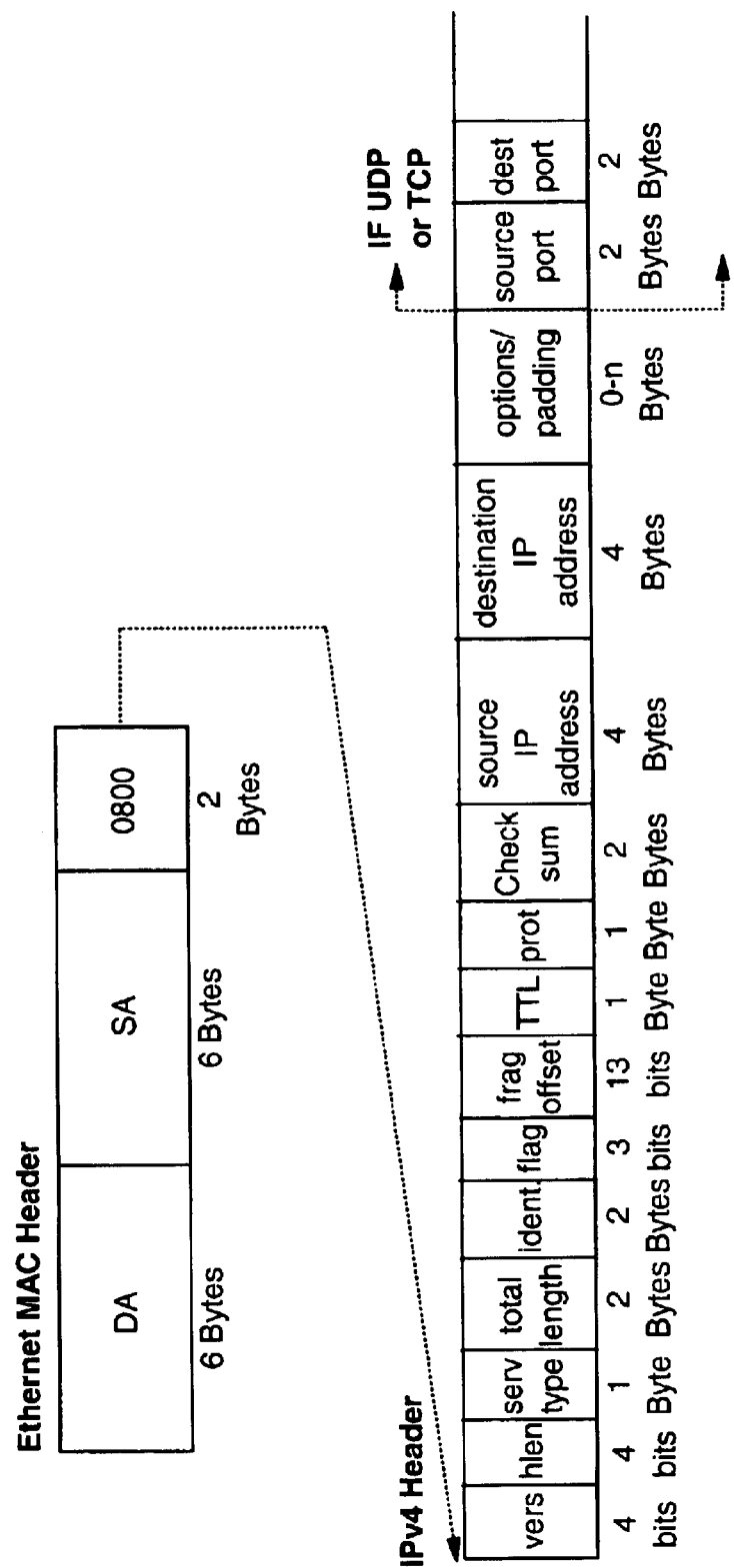
Figure 39:
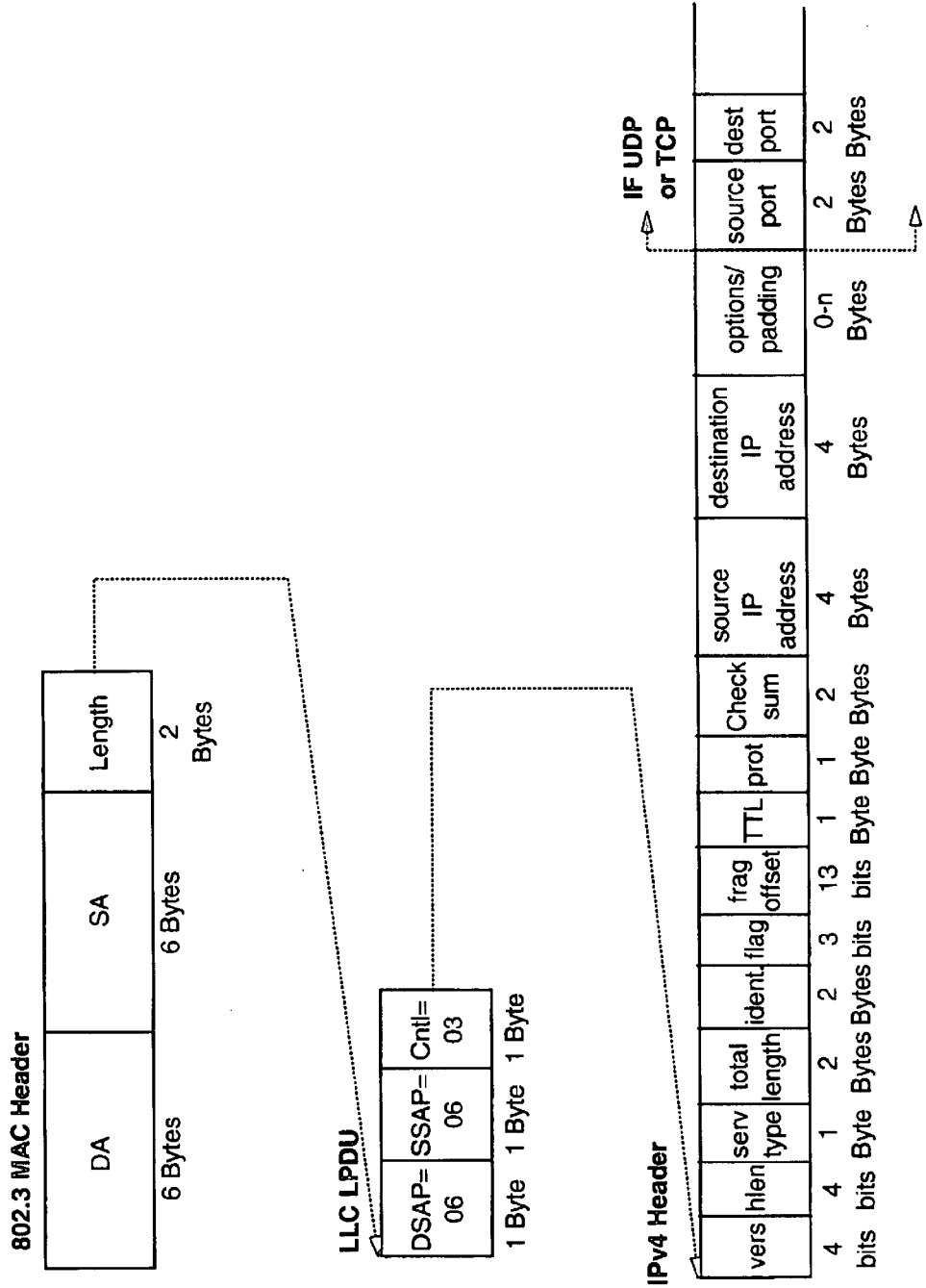

FIG. 3P shows the format of IPv4 over Ethernet where the message includes an Ethernet MAC header and an IPv4 header. The length of each of the fields is shown in this view.

FIG. 3Q illustrates the message format for IPv4 over Ethernet 802.3 with 802.2, showing the MAC header followed by the LLC LPDU, then the IPv4 header.

Figure 3R:
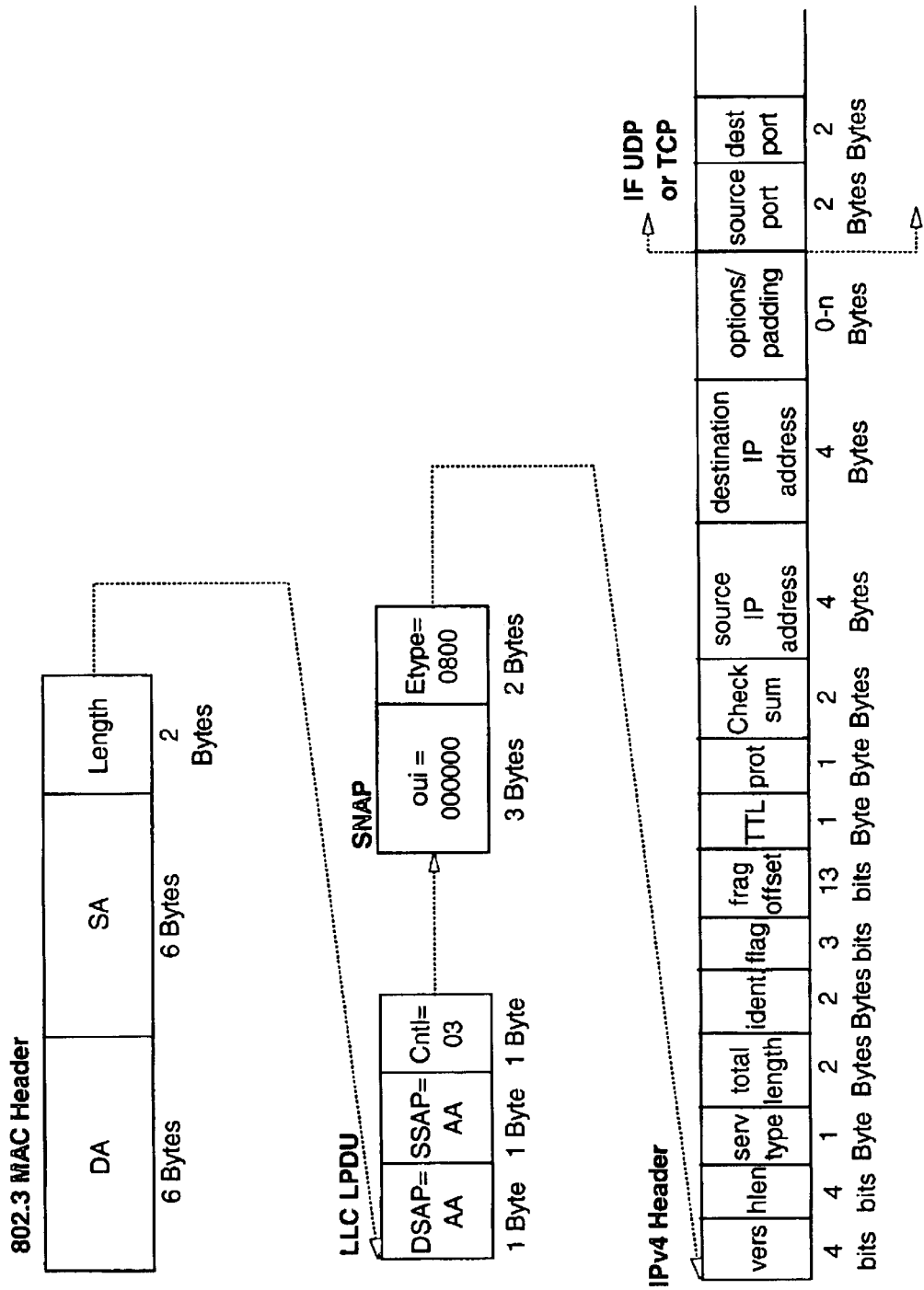

FIG. 3R illustrates the message format for an IPv4 frame over Ethernet 802.3 with SNAP where the 802.3 MAC header is followed by the LLC LPDU, then the IPv4 header (and with a optional trailer for UDP or TCP, if applicable).

Figure 3S:
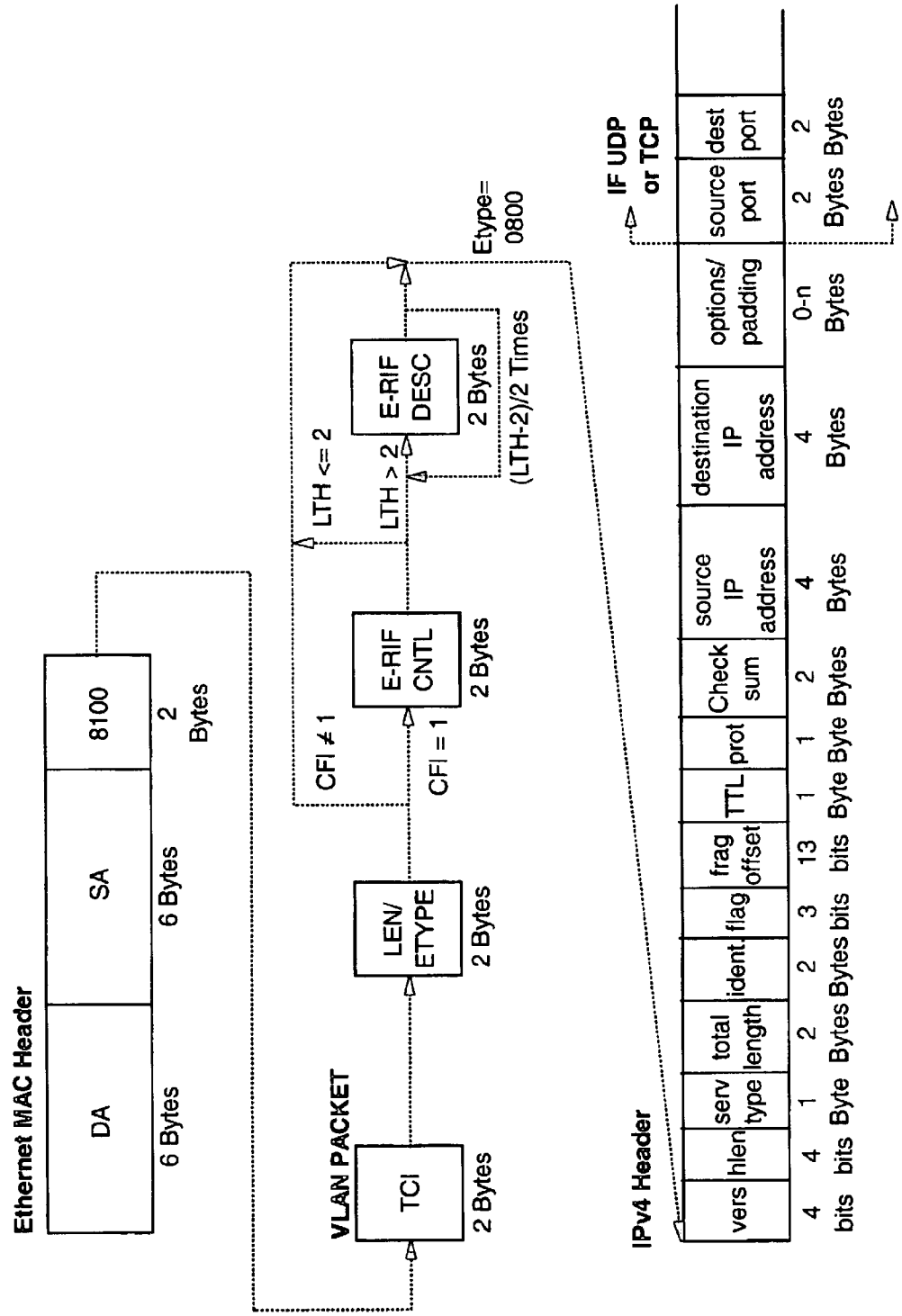

FIG. 3S illustrates the message format for IPv4 over Ethernet with 802.1q VLAN Support. This format has the features of the IPv4 as well as the VLAN Packet seen in other instances of the 802.1q VLAN support.

FIG. 3T illustrates the message format for IPv4 over Ethernet 802.3 (with 802.2) with 802.1q VLAN Support, combining the attributes of IPv4 over 802.3 with 802.2 with the message characteristics of the VLAN Packet.

In each of FIGS. 3H through 3T, the bottom line represents the Layer 3 (or L3) portion of the frame or message, and, because of the variations in size of the material which precedes the L3 portion of the message, the L3 portion of the message begins at different places, depending on the type of message—the protocol and encapsulation method. Although the processing of an L3 message is desired (ignoring the encapsulation), it may be difficult in a multi-protocol and multi-encapsulation system to find the beginning of the L3 message. Further, since the instructions carried out by the one of the plurality of processors 110 on the frame depend on the type of frame protocol and encapsulation method, it is desirable that something (in this case, the hardware classifier assist 118) provide ,a pointer to the correct starting instruction for the processor into the instruction memory 122.

Figure 4:
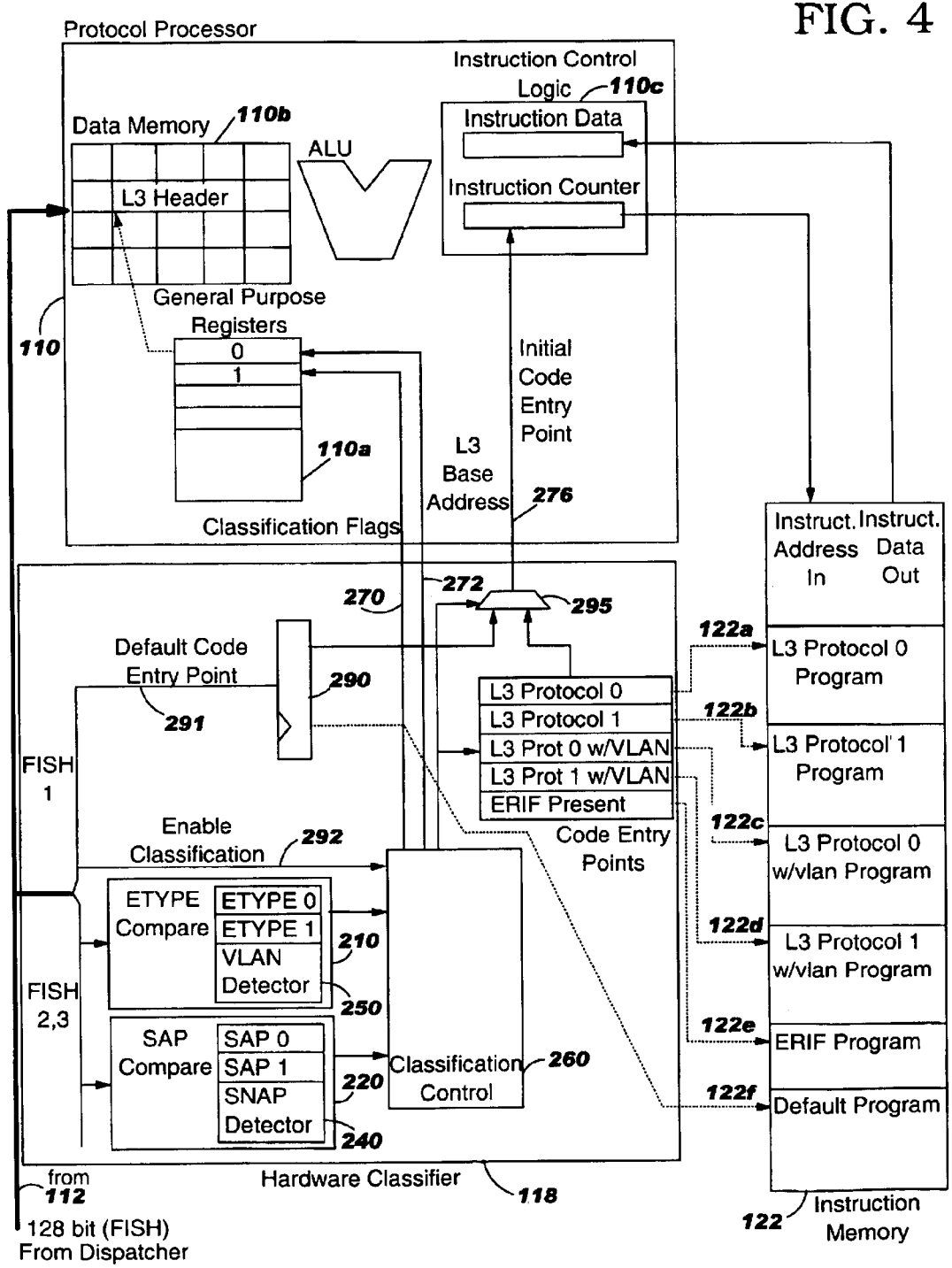
FIG. 4 is a flow chart of the classifier hardware assist of the present invention, showing the logic used by the classifier to process frame portions in the present invention.

FIG. 4 illustrates a block diagram for the classifier hardware assist shown as element 118 in FIG. 2, along with selected portions of the instruction memory 122 and one of the plurality of processing units 110. The classifier hardware assist 118 operates on 128 bit segments associated with the input information unit (or frame), which 128-bits segments are sometimes called "FISH" and are received by the classifier hardware assist 118 (as well as one of the individual processing units 110) from the dispatcher 112. This classification function operates on up to the first 3 FISH (or the first 384 bits associated with a frame, sometimes called FISH1, FISH2 and FISH3 to distinguish one FISH from another). The first FISH (FISH1) is not actually the received frame, but a set of information related to that frame, such as what port the frame came in on, a default code entry point 291 and an indicator 292 (yes or no) whether to enable frame classification using the hardware classifier of the present invention.

At the block 210, the type of Ethernet is compared at varying places in the frame to determine if the fields match a presently-configured protocol, for example, a first Ethernet version (e.g., IPx) or a second Ethernet version (e.g., IPv4). At the block 220, it is determined whether the SAP (service access point) field matches a presently-configured protocol, again as specified in a register (e.g., a specific stored value, indicating a type of protocol). The system also determines whether a SNAP field representing a different type of encapsulation is present (a specific field such as "AAAA03" in block 240 and detects the presence of a virtual local area network (VLAN) usage in the message at block 250. Block 260 is classification control, which, when enabled by the enable classification 292, is responsible for storing the parameters associated with the frame and providing an output indicative of the protocol type, a layer 3 pointer, and classification flags on lines 270, 272, 274.

A control entry point for each message (the beginning of processing, the address of the first instruction in the instruction memory 122) can be determined in advance for each defined format and stored in a table 280. That is, for a ETYPE=0 and no VLAN, then control entry point (the beginning address) is address 122a in the instruction memory, and for an ETYPE=1 and without the VLAN, the control entry point is address 122b. Similarly, for ETYPE=0 with a VLAN and ETYPE=1 with VLAN, the respective control entry points (the place at which the processing of the actual message begins) are instruction 122c and 122d, respectively. Processing will begin at instruction 122t for frames with an ERIF field and at instruction 122f for default programs, where the protocol or encapsulation method is not found.

In any event, a default control entry point is contained in FISH1 of the message and is read at block 290. Block 295 then determines whether to use the default control entry point—if hardware classification is enabled at line 295 and no different control entry point is determined from the block 280, then the default entry is used; otherwise the control entry point from the table 280 is used.

The lines 270, 272 (with the classification flags and the L3 base address determined by the hardware classifier assist 118, respectively) from the hardware classifier 118 are fed to the individual processor 110 which is assigned to process the frame and are stored in general purpose registers 110a associated with the one processing unit which is processing the frame which is stored in data memory 110b. The output line 276 from the device 295 provides the starting address for the instruction memory 122 for the particular type of frame, data which is stored in instruction control logic 110c. An ALU (arithmetic/logic unit) is a part of the processing unit 110. The processor 110 uses the instruction counter in the instruction control logic 110c to fetch an instruction from the instruction memory 122. In this way, based on the protocol and encapsulation method as determined by the hardware classifier assist 118, the processing unit 110 is preconditioned with the starting address of the instruction set which is appropriate for the frame being processed, and appropriate flags indicating the type of frame are set to allow the processor 110 to begin processing the frame using the correct instructions.

Figure 5:
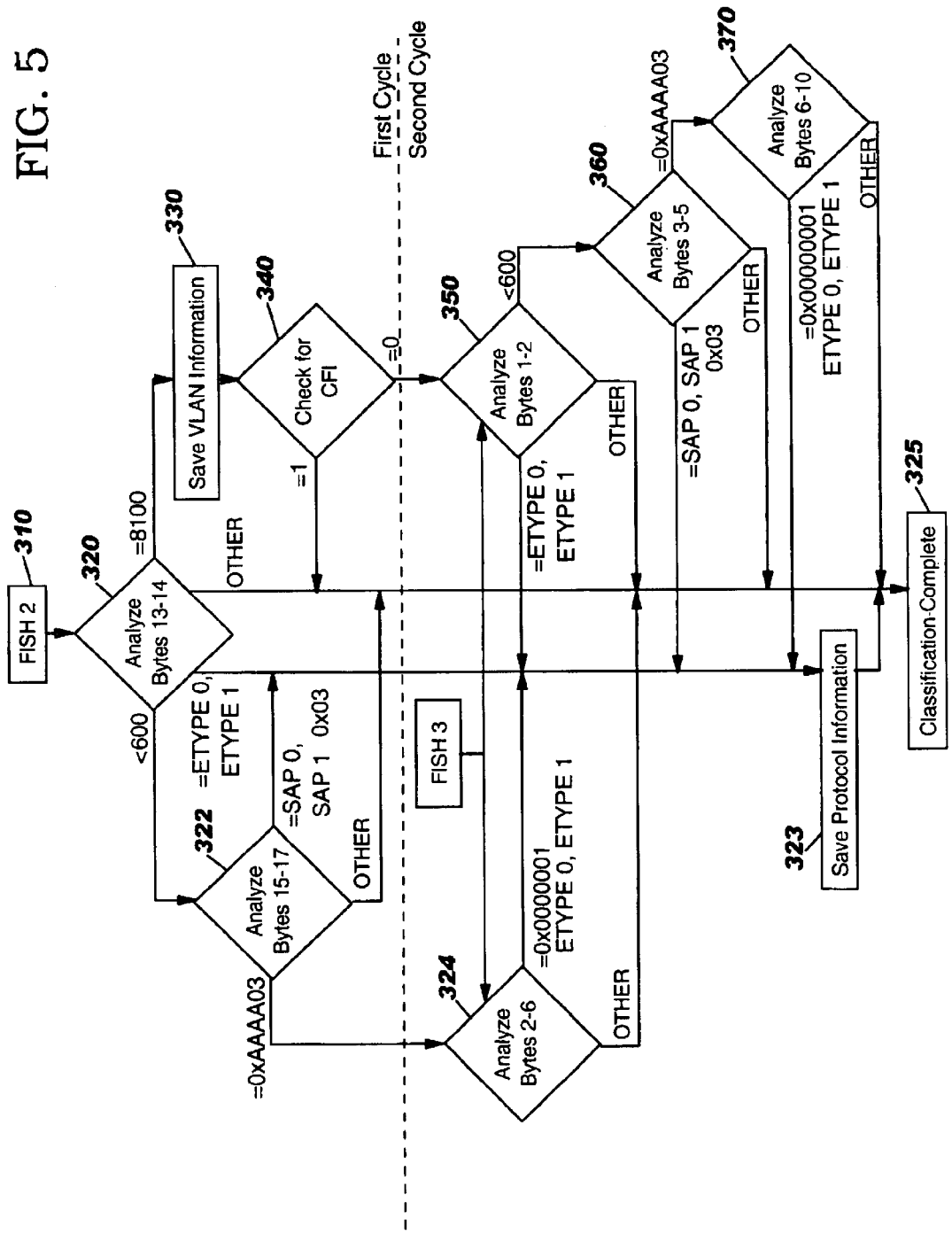
FIG. 5 is a functional diagram illustrating the classifier of the present invention.

FIG. 5 illustrates the logic that this used in determining the categorization of the message format. This begins at block 310 where FISH2 is selected, then at block 320 bytes 13–14 of the frame (the two bytes which would include the type information in a frame which includes the 6 byte destination address DA and the 6 byte source address SA followed by the type) are tested. If these bytes match the content for either ETYPE0 or ETYPE1, then the process identifies the protocol information by setting the appropriate flag at block 323 and concludes the process at block 325. Otherwise, if the type block is less than 0600H (hexadecimal), then the frame is in the Ethernet 802.3 frame format and not the Ethernet V2.0DIX format) and the field is a length field rather than a type field and it is processed on the left side of the diagram of FIG. 5. If this type block is 8100, then the frame is a frame which employs the 802.1q VLAN support (see, for example, FIGS. 3L, 3M, 3N, 3O, 3S and 3T) and it is processed on the right side of the diagram of FIG. 5. If the type field if it is anything else, then control passes to block 325 where classification is considered complete without recording any protocol information, since this frame is apparently an unknown protocol.

If at the block 320 it was determined that the bytes 13–14 were less than 0600H, then at block 322 bytes 15–17 are analyzed to determine whether they are known as a SAP field or an LLC or Logical Link Control field of the type (e.g, AAAA03 used in FIG. 3K). If this field is recognized as one of the SAP fields, then the SAP field is set and protocol information is saved at block 323 before considering the classification complete at block 325. If this is a SNAP field, then control continues to block 324 where FISH3 is obtained and bytes 2–6 of it are analyzed for a recognized ETYPE. If the ETYPE is recognized, then the protocol information is saved at block 323 before exiting at block 325.

If at block 320 it was determined that the bytes 13–14 were equal to 8100 indicating that this is a virtual local area network (VLAN) as specified in IEEE standard 802.1q, then the existence of the VLAN is saved at block 330, then at block 340, the presence of a CFI field is checked. If it is present, then classification is complete and control passes to block 325. If not, then at block 350, bytes 1–2 of FISH3 are tested to determine whether they provide a known ETYPE (like the test at block 320) or a length (less than 0600H). If they provide an ETYPE, then the protocol information is saved at block 323 and control passes to block 325 where the classification is considered complete. If the field in block 350 is not recognized as an ETYPE, then the classification process is considered complete at block 325. If the test at block 350 provided a length (less than 0600H), then at block 360, bytes 3–5 are tested for a known SAP. If it is AAAA03, then control passes to block 370 for determination of the bytes 6–10 for a known ETYPE.

Figure 6:
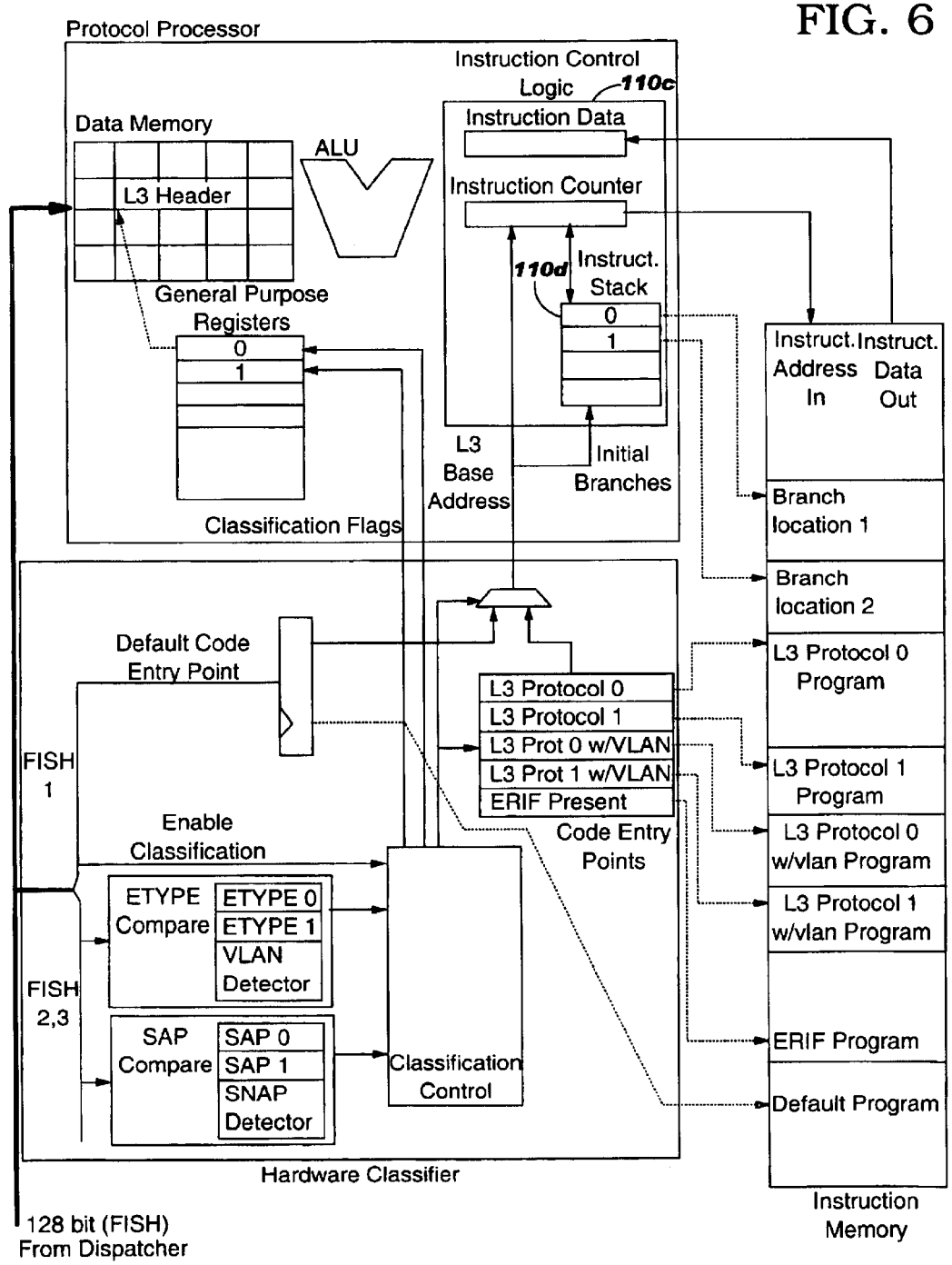
FIG. 6 is an alternate embodiment of the hardware classifier of the present invention with optional enhancements shown, allowing a series of addresses to be stored in a stack in addition to the address of the first instruction.

FIG. 6 illustrates an improved version of the hardware classifier, particularly of the elements of FIG. 4. In this FIG. 6, the hardware classifier includes the elements of FIG. 4 with an improvement to the instruction control logic 110c including, instead of a single beginning address, a series of addresses stored in an instruction stack 110d. This instruction stack includes the initial instruction address, followed by other addresses needed when the processor reaches a fork or branch, to avoid further testing or conditional statements at later branches. The starting addresses then are stored in order in a stack and removed from the stack when a branch instruction is needed.

For further information about the definitional content of Ethernet messages of various protocols or encapsulation techniques, the reader is directed to the appropriate standard or reference guide for Ethernet frame construction. Some generally available documents which may be useful in the understanding of Ethernet protocols and encapsulation techniques and the standards and options related thereto are: ISO/IEC Final CD 15802-3, IEEE P802. ID/D15, Nov. 24, 1997, Annex C; IEEE Draft Standard 802.1Q/D9 dated Feb. 20, 1998; RFC 1700—Assigned Numbers by J. Reynolds and J. Postel, October, 1994 (a document which is also available at http://www/isi.edu/rfc-editor/rfc.html); IBM Token Ring Network Architecture Reference; and IBM LAN Bridge and Switch Summary. Publication Number SG24-5000-00, Version 1.3, January, 1996, particularly Chapter 1.1.1.

The hardware classifier may be designed in various ways including through the use of one of a variety of generally available software tools for designing and manufacturing logic designs in a hardware (or in the actual implementation on the silicon substrate) configuration, as well as being designed by traditional design by hand by a logic designer. In this example, the desired tests are programmed using a software language known as VLSI hardware definition language, or shortened to (VHDL), and then put through a known piece of software (such as one marketed by IBM or one marketed by Synopsis) to create a design with the necessary gates and logic to accomplish the desired tests in a hardware fashion. Other similar design systems exist and can be used to advantage, so that the designer of the logic need not know the structure of the gates or their location, only their logical function of desired inputs and tests and outputs.

Of course, many modifications of the present invention will be apparent to those skilled in the relevant art in view of the foregoing description of the preferred embodiment, taken together with the accompanying drawings. For example, the actual type of implementing hardware for the classifier is subject to many design choices, and the particular choices described depend on the message content, and the method of message encapsulation and the processing to be done. Additionally, many modifications can be made to the system implementation and the message configuration which the system can handle without departing from the spirit of the present invention. Accordingly, the foregoing description of the preferred embodiment should be considered as merely illustrative of the principles of the present invention and not in limitation thereof.

Having thus described the invention, what is claimed is:

1. An apparatus comprising:
   a semiconductor substrate;
   N processing units fabricated on the substrate, where N>1;
   first internal data memory fabricated on said substrate, said data memory for storing information accessible to said N processing units;
   a dispatcher fabricated on the semiconductor substrate and operatively coupled to the N processing units for receiving and transmitting to one of the N processing units an input information unit;
   a classifier coupled to the dispatcher, said classifier fabricated on the semiconductor substrate and including a comparison unit for determining a data format for an input information unit and for generating and storing in the internal data memory output indicators for the input information unit output indicators indicating the data format of the input information unit and a starting address for the input information unit, indicators and the starting address which are available to the one of the N processing units during its processing the input information unit and used in the processing of the input information unit; and
   a completion unit carried on the semiconductor substrate and operatively connected to the N processing units for receiving the information unit processed by the one of the N processing units.

2. An apparatus of the type described in claim 1 wherein the comparison unit includes a test for a virtual local area network field contained in the input information data and the generated output indicators include an indicator for identifying the presence of the virtual local area network field in the input information unit.

3. The apparatus of claim 1 wherein the classifier includes a plurality of hardware devices formed in the substrate.

4. An apparatus of the type described in claim 1 wherein the output indicators include indicators identifying the type of input information unit and its layer 2 encapsulation technique.

5. An apparatus of the type described in claim 1 wherein the indicators include a default code entry point.

6. An apparatus of the type described in claim 1 wherein the classifier includes a system for determining a code entry point based on the type of input information unit and its encapsulation technique as determined by the classifier.

7. An apparatus of the type described in claim 1 wherein the classifier includes a system for determining a default code entry point and a code entry point based on the type of input information unit.

8. An apparatus of the type described in claim 7 wherein the apparatus further includes a selector for selecting from the default code entry point and the code entry point based on the type of input information unit.

9. An apparatus of the type set forth in claim 8 further including a system for identifying whether virtual local area network information is included in the input information unit.

10. A method of processing an input information unit comprising the steps of:
    receiving the input information unit at a dispatcher;
    sending the input information unit from the dispatcher to one of a plurality of processors for processing;
    reading selected bits from the input information unit while the information unit is being sent from the dispatcher to the one of the plurality of processors without using a plurality of look-up tables and concatenated classification keys;
    testing the read bits from the input information unit against known indicators identifying predetermined types of input information units to identify the type and protocol of the input information unit or that the input information unit does not meet any predetermined identifying type of input information unit; and
    based on the results of the testing of bits from the input information unit, storing indicators of the type of input information unit and other information about that input information unit; and
    using at the one of a plurality of processing units the stored indicators and the other stored information about the input information unit in the processing of the input information unit.

11. A method including the steps of claim 10 wherein the step of generating the indicators and storing the indicators occurs while the input information unit is being sent to one of the plurality of processors so that, when the one of the plurality of processors processes the input information unit, the indicators and the other information have been determined and stored and the one of the plurality of processors uses the indicators and other information about the input information unit in processing that input information unit.

12. A method including the steps of claim 10 and further including the step of generating a starting address for the further processing of the input information unit based on the content of the input information unit and the step of using the stored indicators at the one of the plurality of processing units includes using the starting address.

13. A method including the steps of claim 10 wherein the step of reading and testing is accomplished in hardware, whereby the process is accomplished in fewer processing cycles than if the reading and testing was accomplished by executing a series of stored instructions.

14. A method including the steps of claim 13 wherein the step of using hardware to accomplish the identification of the type of input information unit and storing indicators is accomplished within two machine cycles, whereby the step of using the indicators in one of the plurality of processing units occurs earlier than if the tests were accomplished by executing a series of programmed instructions in sequence.

15. A method of processing information units of the type described in claim 14 wherein the step of testing and storing indicators for an input information unit overlaps with the step of receiving the input information unit from the dispatcher at one of the plurality of processing units.

16. A method of identifying an input frame and providing indicators relating to that frame for further processing of the frame, the steps of the method comprising:
   determining from the input frame a type of encapsulation and a protocol type by comparing a section of the input frame with a predetermined content indicative of a type of encapsulation and a protocol type;
   generating and storing with respect to each input frame indicators of the type of encapsulation and the protocol type for that input frame without using a plurality of look-up tables and concatenated classification keys;
   determining and storing the location of a layer 3 header for the input frame; and
   determining and storing a beginning point for further processing of the input frame, based on the determined type of protocol and encapsulation method, whereby said location and beginning point may be used in further processing of the input frame.

17. A method of determining the characteristics of an input frame including the steps of claim 16 wherein the step of determining a beginning point for further processing includes the step of determining a default code entry point from the input frame, then using the input frame protocol and encapsulation method to determine if a stored control entry point has been stored for that combination of encapsulation and protocol, using the stored control entry point for the starting point for further processing if one exists and otherwise using the default code entry point as the starting point for further processing.

18. A device for receiving from a network and processing data packets of varying formats comprising:
   a plurality of processors, each operating independent of the other, for processing a data packets and providing an output data packet which is based on the input data packet;
   a dispatch unit connected to the processors for receiving a data packet from the network and assigning the packet to one of the plurality of independent processors;
   a classification device connected to the dispatch unit for receiving the packet and determining its protocol and encapsulation technique as well as a starting address for further processing of the packet by the processing units, the classification device including:
      logic to determine the encapsulation technique based on a portion of the packet without using a plurality of look-up tables and concatenated classification keys;
      logic to determine the presence of a virtual local area network information in the packet; and
      an output for each packet including the type of encapsulation and the starting address for further processing.

19. An apparatus of the type described in claim 18 wherein the classifier is embodied in hardware without a stored program.

20. An apparatus of the type described in claim 18 wherein the classification occurs in two cycles so that further processing of the packet by one of the processing units can begin within two cycles after the packet is dispatched by the dispatching unit.

21. An apparatus of the type described in claim 18 wherein the starting address is determined by generating a default starting address from the packet and using that default address as the starting address for processing the packet unless a different starting address is stored for the encapsulation method and protocol determine by the classification system.

22. An apparatus for analyzing a frame of information having a variable protocol and encapsulation and for providing a starting location for processing that frame and a pointer to the initial instruction for processing that frame, the apparatus comprising:
   a comparator for looking at predetermined bytes of the frame and determining if those bytes indicate a length or a protocol without using a plurality of look-up tables and without classification keys being concatenated;
   logic for determining the protocol and encapsulation system for the frame;
   using the protocol and encapsulation system to determine a starting location for processing the frame and a pointer to the initial instruction for processing the frame.

23. A method of processing an input information unit comprising the steps of:
   receiving the input information unit at a dispatcher;
   sending the input information unit from the dispatcher to one of a plurality of processors for processing;
   reading in hardware selected bits from the input information unit while the information unit is being sent from the dispatcher to the one of the plurality of processors;
   testing in hardware the read bits from the input information unit against known indicators identifying predetermined types of input information units to identify the type and protocol of the input information unit or that the input information unit does not meet any predetermined identifying type of input information unit within two machine cycles, whereby the process of reading and testing is accomplished in fewer processing cycles than if the reading and testing was accomplished by executing a series of stored programmed instructions in sequence; and
   based on the results of the testing of bits from the input information unit, storing indicators of the type of input information unit and other information about that input information unit; and
   using at the one of a plurality of processing units the stored indicators and the other stored information about the input information unit in the processing of the input information unit.

24. A method of processing information units of the type described in claim 23 wherein the step of testing and storing indicators for an input information unit overlaps with the step of receiving the input information unit from the dispatcher at one of the plurality of processing units.

25. A device for receiving from a network and processing data packets of varying formats comprising:
   a plurality of processors, each operating independent of the other, for processing a data packets and providing an output data packet which is based on the input data packet;

a dispatch unit connected to the processors for receiving a data packet from the network and assigning the packet to one of the plurality of independent processors;

a classification device connected to the dispatch unit for receiving the packet and determining its protocol and encapsulation technique within two cycles so that further processing of the frame by one of the processing units can begin within two cycles after the packet is dispatched by the dispatching unit as well as a starting address for further processing of the packet by the processing units, the classification device including:

logic to determine the encapsulation technique based on a portion of the packet logic to determine the presence of a virtual local area network information in the packet; and an output for each packet including the type of encapsulation and the starting address for further processing.

* * * * *